United States Patent
Lang et al.

(10) Patent No.: US 12,296,425 B2
(45) Date of Patent: May 13, 2025

(54) CLAMPING DEVICE AND METHOD FOR HANDLING A WORKPIECE

(71) Applicant: LANG TECHNIK GMBH, Holzmaden (DE)

(72) Inventors: Guenter Lang, Wernau (DE); Philipp Lang, Holzmaden (DE)

(73) Assignee: LANG TECHNIK GMBH, Holzmaden (DE)

( * ) Notice: Subject to any disclaimer, the term of this patent is extended or adjusted under 35 U.S.C. 154(b) by 0 days.

(21) Appl. No.: 17/857,422

(22) Filed: Jul. 5, 2022

(65) Prior Publication Data
US 2023/0001526 A1    Jan. 5, 2023

(30) Foreign Application Priority Data

Jul. 5, 2021    (DE) .......................... 102021117229.2

(51) Int. Cl.
*B23Q 3/157*    (2006.01)
*B23Q 1/00*    (2006.01)
(Continued)

(52) U.S. Cl.
CPC ....... *B23Q 3/15706* (2013.01); *B23Q 1/0072* (2013.01); *B23Q 3/06* (2013.01);
(Continued)

(58) Field of Classification Search
CPC .... B23Q 1/0072; B23Q 1/0081; B23Q 1/009; B23Q 3/066; B23Q 7/1426; B23Q 7/1431;
(Continued)

(56) References Cited

U.S. PATENT DOCUMENTS

| | | | |
|---|---|---|---|
| 3,429,543 A | 2/1969 | Mooney | |
| 5,297,454 A * | 3/1994 | Ito ........................... | F16H 27/02 74/813 L |

(Continued)

FOREIGN PATENT DOCUMENTS

| | | | |
|---|---|---|---|
| DE | 202008004787 U1 * | 8/2008 | ............. B23Q 1/009 |
| DE | 102012219140 A1 | 4/2014 | |

(Continued)

OTHER PUBLICATIONS

German Office Action corresponding to DE Application No. 10 2021 117 229.2; Mailing Date, May 2, 2024.

*Primary Examiner* — Erica E Cadugan
*Assistant Examiner* — Michael Vitale
(74) *Attorney, Agent, or Firm* — CANTOR COLBURN LLP

(57) ABSTRACT

A clamping device and a method for handling a workpiece or a unit comprising a workpiece and a workpiece holder. An automatic workpiece exchange is enabled by using a tool spindle. For this a spindle adapter is present that can be releasably connected with the workpiece holder. By means of the spindle adapter, the unit comprising the workpiece and the workpiece holder can be transported. The clamping device can be switched between a release condition and a clamping condition by means of a movement of an operating element. This movement can be carried out by means of the tool spindle, in that the tool spindle engages the operating element directly or indirectly by means of the spindle adapter or an operating tool.

16 Claims, 16 Drawing Sheets

(51) Int. Cl.
*B23Q 3/06* (2006.01)
*B23Q 7/00* (2006.01)
*B23Q 7/14* (2006.01)

(52) U.S. Cl.
CPC ...... *B23Q 7/1431* (2013.01); *B23Q 2230/002* (2013.01); *Y10T 483/10* (2015.01); *Y10T 483/16* (2015.01); *Y10T 483/1793* (2015.01)

(58) Field of Classification Search
CPC ........... B23Q 2230/002; B23Q 3/15706; B25J 9/046; Y10T 483/16
USPC .............................................. 269/309; 483/14
See application file for complete search history.

(56) References Cited

U.S. PATENT DOCUMENTS

| | | | | |
|---|---|---|---|---|
| 5,481,944 | A * | 1/1996 | Oketani | B23Q 16/065 |
| | | | | 74/816 |
| 8,020,877 | B2 * | 9/2011 | Lang | B25B 1/2405 |
| | | | | 279/123 |
| 2004/0051225 | A1 * | 3/2004 | Etter | B23Q 1/0072 |
| | | | | 269/309 |
| 2004/0256780 | A1 * | 12/2004 | Lang | B23Q 1/0072 |
| | | | | 269/309 |
| 2005/0179188 | A1 * | 8/2005 | Sato | B23Q 3/103 |
| | | | | 269/309 |
| 2009/0051094 | A1 * | 2/2009 | Sandmeier | B27G 13/10 |
| | | | | 269/258 |
| 2011/0008119 | A1 | 1/2011 | Neumaier et al. | |
| 2016/0023329 | A1 * | 1/2016 | Schlüssel | B25B 1/103 |
| | | | | 269/242 |
| 2017/0136551 | A1 * | 5/2017 | Graulich | B23Q 3/06 |
| 2021/0016404 | A1 | 1/2021 | Ulrich et al. | |
| 2021/0362293 | A1 * | 11/2021 | Eugler | B25J 9/0096 |
| 2022/0212299 | A1 * | 7/2022 | Lang | B23Q 1/0072 |

FOREIGN PATENT DOCUMENTS

| | | | | |
|---|---|---|---|---|
| DE | 102013218050 A1 * | 3/2015 | ........... | B23Q 1/0072 |
| DE | 202014104201 U1 * | 1/2016 | ............. | B25B 1/103 |
| DE | 102014112845 A1 | 3/2016 | | |
| DE | 202014105888 U1 * | 4/2016 | ............. | B25B 1/103 |
| DE | 102019100089 B3 | 11/2019 | | |
| DE | 102019116262 A1 | 12/2020 | | |
| EP | 0215209 A2 | 3/1987 | | |
| EP | 2269770 A1 | 1/2011 | | |
| WO | 2019175024 A1 | 9/2019 | | |
| WO | 2020083416 A1 | 4/2020 | | |
| WO | 2021013899 A1 | 1/2021 | | |

* cited by examiner

CLAMPING DEVICE AND METHOD FOR HANDLING A WORKPIECE

CROSS REFERENCE TO RELATED APPLICATIONS

This application claims priority under 35 U.S.C. § 119 to the following German Patent Application No. 10 2021 117 229.2, filed on Jul. 5, 2021, the entire contents of which are incorporated herein by reference thereto.

TECHNICAL FIELD

The invention refers to a clamping device and a method for handling a workpiece, particularly for automatically clamping a workpiece or for automatically exchanging a workpiece in a machine tool.

BACKGROUND

It is known from EP 2 269 770 A1 to store tools and workpieces together in a magazine. The tools can be picked up out of the magazine by means of the tool spindle and can be used for machining. The workpieces are provided with a respective interface or adapter, such that the workpiece can be held in the tool spindle that is in fact provided for holding the tool. In doing so, the workpiece can be rotationally driven by means of the tool spindle, for example, and can be machined by means of an immovable tool.

A similar principle is also described in EP 0 215 209 A2. There, the adapter by means of which a workpiece can be picked up from the magazine by means of the tool spindle can be removed during clamping of the workpiece in a workpiece clamping device and can be disposed again. Then the workpiece can be machined.

WO 2021/013899 A1 discloses a method for handling of workpieces that can be stored together with tools in a cocoon in a magazine. The cocoon consists of a support and a bottom. The workpiece is arranged on the bottom. The support can be held by means of the tool spindle and the cocoon can be arranged in the machine tool. By means of a relative movement between the support and the bottom of the cocoon, a releasable connection between the support and the bottom can be released and the cocoon can be opened thereby. The tool spindle can subsequently dispose the support, take out the tool and machine the workpiece arranged on the bottom.

BRIEF SUMMARY

Starting from the known prior art it is an object of the present invention to provide a clamping device and a method in order to simplify handling of a workpiece and particularly clamping and releasing the workpiece in the machine tool.

This object is solved by a clamping device for clamping a workpiece holder on a machine tool, including: a base having a support surface for arranging of the workpiece holder, an operating device arranged on the base that comprises an operating element that can be moved between a first position and a second position along a path around a height axis, wherein the clamping device is in a release condition releasing the workpiece holder, if the operating element is in the first position, wherein the clamping device is in a clamping condition clamping the workpiece holder, if the operating element is in the second position.

This object is also solved a method for handling a workpiece in a machine tool, wherein the machine tool includes storing locations for workpieces and tools and further includes a tool spindle that is movable in multiple degrees of freedom, wherein the method includes the following steps: attaching a clamping device for clamping a workpiece holder on the machine tool, providing at least one tool and at least one workpiece unit including a workpiece holder with a workpiece and a spindle adapter connected with the workpiece holder, picking up the workpiece holder by means of the spindle adapter by the tool spindle, transporting the workpiece holder to the clamping device and placing the workpiece holder on the clamping device, operating an operating element of the clamping device by means of a movement of the tool spindle in order to bring the clamping device into a clamping condition, releasing a connection between the spindle adapter and the tool spindle, picking up a tool and carrying out actions on the workpiece by means of the tool arranged in the tool spindle.

The clamping device according to the invention is configured for clamping a workpiece holder on a machine tool. The clamping device has a base having a support surface. The support surface is configured such that the workpiece holder can be arranged thereon and can be held there. In doing so, it is particularly pulled with a tensile force against the support surface. Preferably the support surface is planar.

The base can have multiple holes for receiving a holding bolt arranged on the workpiece holder. The holding bolts engage a hole on the base in each case during arrangement of the workpiece holder on the clamping device.

The clamping device has an operating device with an operating element. The operating element is movable, e.g. rotatable or pivotable, along a path around a height axis. The path comprises a first position and a second position and can, for example, extend between these positions. For example, the path can be a circular path or a circular arc path around the height axis. The height axis preferably intersects the support surface and can be a center axis of the base. The height axis can intersect the geometric center of the support surface.

The clamping device is in a release condition releasing the workpiece holder, if the operating element is in the first position. If the operating element is, however, in the second position, the clamping device is in a clamping condition holding the workpiece holder on the support surface.

Particularly the operating device can comprise clamping bodies that are movably coupled with the operating element, wherein one clamping body is assigned to each hole. In the release condition the clamping bodies are in a position in which the insertion and removal of a holding bolt into a hole or out of a hole on the base is possible. In the clamping condition of the clamping device each holding bolt is engaged by an assigned clamping body and is retained inside the hole or is pulled into the hole, such that a workpiece holder is held on the base or on the support surface.

In that the operating element can be moved along a path around the height axis between the first position and the second position, the operating element can be operated simply by means of a movement of a tool spindle of the machine tool. For example, the tool spindle can initiate a rotation movement around the spindle axis in order to move the operating element from the first position into the second position or vice versa from the second position into the first position. Preferably an appropriate device is held by the tool spindle for this purpose, e.g. a spindle adapter or another operating tool, by means of which a movement along the path around the height axis can be carried out. For operation of the operating element it is advantageous, if the height axis of the base or the clamping device and the spindle axis of the tool spindle coincide during the movement of the operating element along the path.

Such a clamping device can be particularly used for automatic clamping or releasing of workpieces in a machine tool. The clamping device can be arranged in an anyhow present machine clamping device of the machine tool for this purpose and can be held there. The machine clamping device does not have to be able to be clamped and released in an automatic or controlled manner for this purpose. The clamping and releasing of the workpiece holder is carried out by means of the clamping device according to the invention, in that the operating element is moved by means of an operating movement of the tool spindle in the first position or the second position. During the machining of workpieces and during workpiece exchange the clamping device can be continuously clamped in the machine clamping device of the machine tool.

In a preferred embodiment the operating device comprises at least one slider that abuts directly or indirectly against the operating element. The at least one slider is movably supported along a first extension direction. It can be moved into different positions by means of a movement of the operating element. The at least one slider is movably coupled with multiple or all of the clamping bodies. Each clamping body is at least movably coupled with one of the sliders.

For transmission of the movement of the operating element along the path in a linear movement of the slider, at least one cam follower arrangement with respectively one cam surface can be used, wherein the cam surface comprises a non-concentric, but eccentric extension relative to the height axis of the clamping device. For example, the at least one cam surface can extend around the height axis along at least a section of a spiral winding or along a complete spiral winding. The cam surface extends particularly at most along one complete spiral winding. With view around the height axis different sites on the at least one cam surface have different distances to the height axis. The profile of the cam surface is curved, wherein the curvature varies. The cam surface can face the height axis or can face away from the height axis.

In an embodiment the at least one cam surface is provided on the operating element. The at least one slider can abut against the respectively assigned cam surface. Thereby the cam surface is facing the slider and the height axis. In another embodiment the at least one cam surface can face away from the height axis and can be provided on the at least one slider, wherein the operating element abuts against the at least one cam surface. In this embodiment the number of cam surfaces corresponds to the number of provided sliders.

In order to minimize the torque necessary for rotation of the operating element around the height axis or the force necessary for the movement of the operating element along the path, the friction during movement of the operating element or the at least one slider along the cam surface can be reduced. In an embodiment a roller bearing contact between the operating element or the at least one slider and the respectively assigned cam surface can be realized for this purpose. For example, at least one roller body can abut in a rollable manner against each provided cam surface. The roller body can be supported rotatably on the operating element or on the slider depending on the embodiment.

The at least one slider is particularly movably coupled with the clamping bodies of the operating device. For this purpose an arbitrary form of a mechanical transmission can be used. In an embodiment the movement coupling is achieved by means of a wedge surface arrangement or a wedge surface transmission. For a movement coupling also other transmission means or elements can be used, such as toothed wheels, toothed racks, etc.

The operating device can comprise at least one balancing unit. The at least one balancing unit can be arranged anywhere in the force transmission path between the operating element and each of the clamping bodies. If multiple separate force transmission paths are provided, each force transmission path comprises at least one balancing unit. The at least one balancing unit is configured to limit the clamping force that can be transmitted from the clamping bodies to the holding bolts. In doing so, a uniform clamping can be achieved and possible asymmetric force transmissions on the clamping bodies, due to tolerances during manufacturing of components and the assembly can be compensated at least in part.

In an embodiment each balancing unit comprises at least one elastically deformable body, e.g. a helical spring and/or a cup spring and/or a plastic body, etc. For example, each provided slider of the operating device can comprise a balancing unit or at least one elastically deformable body. In an embodiment the slider is separated in two parts and the balancing unit is arranged between the two slider parts that are supported in a manner to be movable relative to one another. The at least one balancing unit or the at least one elastically deformable body is configured to deform elastically, if the force in the respective force transmission path increases or increases considerably. For example, two separate slider parts can move relative to one another due to the elastic deformation of the balancing unit or the at least one elastical body, such that a further clamping force increase transmitted via the clamping bodies is at least reduced.

In a preferred embodiment the operating element is formed by an operating ring that can be arranged coaxially to the height axis. The operating ring can surround the support surface. Alternatively to the operating ring, the operating element could also be a ring segment or another arc-shaped element that extends around the height axis in an angular range less than 360°.

A spindle adapter can be used for transport of the workpiece holder with the workpiece. The spindle adapter is configured to be held in the tool spindle of the machine tool and can comprise a spindle interface for this purpose, e.g. a taper such as a Morse taper, steep taper or hollow shank taper. Particularly, the spindle adapter is configured to be releasably connected with the workpiece holder. A workpiece unit comprises the spindle adapter, the workpiece holder and the workpiece arranged thereon and therefore can be transported by means of the tool spindle, particularly from a storing location to the clamping device or vice versa. Thus, not only the clamping of the workpiece holder, but also its transport is simply possible by movement control of the tool spindle.

It is advantageous, if the operating element comprises a coupling device that is configured to be releasably connected with a counter coupling device of the spindle adapter. The releasable connection is particularly form-fit and preferably torque-proof in movement direction of the operating element, such that a rotation movement of the spindle adapter results in a movement of the operating element along the path between the first position and the second position.

Preferably the connection between the coupling device and the counter coupling device is established or disconnected by means of a movement parallel to the height axis.

As an example, the coupling device can comprise at least one projection extending in direction of the height axis that engages into a recess of the counter coupling device, if the connection is established. In a direction around the spindle axis the recess of the counter coupling device or spindle adapter can have a dimension that corresponds to the dimension of the projection or can be larger in order to allow a rotation movement of the spindle adapter around the spindle axis during which a movement of the operating element is not yet carried out. In addition or as an alternative, the counter coupling device can also have a projection that engages into a recess on the coupling device, if the connection is established. This releasable connection can be simply established or disconnected by means of a movement of the tool spindle or the spindle adapter parallel to the height axis.

It is advantageous, if the spindle axis of the tool spindle coincides with the height axis of the clamping device, if the connection between the coupling device and the counter coupling device is established.

The invention also refers to a method for handling of a workpiece. The method is particularly suitable for machine tools that do not have complex grippers or manipulators for automatic tool change and/or automatic workpiece change. The inventive method allows the tool handling and the workpiece handling by means of the tool spindle of the machine tool.

The tool spindle is movable in multiple degrees of freedom relative to the clamping device, e.g. in two or three linear degrees of freedom. Additionally or alternatively, the tool spindle can also be movable in one or more rotational degrees of freedom relative to the clamping device. The tool spindle can in addition comprise a spindle holder that can be rotated around the spindle axis.

The machine tool has storing locations for workpieces and tools, e.g. a magazine unit for workpieces and tools. The magazine unit can consist of one single common magazine or multiple separate magazines. The storing locations of the magazine unit can be movable relative to a machine base of the machine tool. In addition or as an alternative to this, at least one storing location for a tool or a workpiece can be immovably relative to the machine base of the machine tool. The magazine unit can comprise one or more chain magazines and/or turret magazines and/or other magazines. The magazine unit can have multiple movable magazine locations and can particularly be configured to bring one or more of the provided magazine locations in an exchange position in that the respective magazine location or magazine locations can be reached by the tool spindle of the machine tool. For example, a tool or workpiece that is stored there can be directly picked up from the magazine unit by the tool spindle without interposition of grippers and/or manipulators.

In at least one of the storing locations a workpiece to be machined can be stored. Each workpiece to be machined is held on a workpiece holder. The workpiece holder comprises a spindle adapter. The spindle adapter can be releasably or non-releasably connected with the workpiece holder. The spindle adapter has an interface by means of which the spindle adapter can be directly picked up by the tool spindle of the machine tool. It is the same interface that is also provided on the tools in order to hold the tools in the tool spindle. For example, the interface can be a taper, e.g. a Morse taper, steep taper or hollow shank taper.

In at least one of the storing locations a tool is provided in addition that comprises the interface for being held in the tool spindle.

In the machine tool and particularly on a machine clamping device of the machine tool, a clamping device is arranged. The clamping device is configured to clamp the workpiece holder with a workpiece in the machine tool. The clamping device has an operating element in order to bring the clamping device in a clamping condition. Particularly, the clamping device can be brought again into a release condition by means of the operating element. In an embodiment the operating element can be rotatable around a rotation axis. Preferably the operating element is pivoted by a rotation of pivot angle that is less than 360° and further preferably at most 180° or at most 90° in order to bring the clamping device from the release condition in the clamping condition or vice versa.

The clamping device that is used in the method can correspond to one or more embodiments described above. For example, the rotation axis can be the height axis of the clamping device according to the invention. In the method according to the invention, however, also other modified embodiments of the clamping device can be used.

The tool spindle picks up a workpiece holder with a workpiece to be machined by means of the spindle adapter from one of the storing locations and transports the workpiece holder to the clamping device. The clamping device is placed on the support surface. Subsequently, during or after releasing the connection between the spindle adapter and the workpiece holder, the operating element is moved from the first position into the second position such that the clamping device is switched from the release condition into the clamping condition. The workpiece holder is now clamped or held on the clamping device. The actuation of the operating element is thereby carried out particularly by means of the spindle adapter held in the tool spindle and preferably by means of a rotation movement of the spindle adapter around the spindle axis.

Subsequently, the connection between the spindle adapter and the tool spindle can be released. For example, the spindle adapter can be put down in an empty storing location, preferably in a magazine unit. Subsequently, the tool spindle can pick up a tool and actions can be carried out on the workpiece that is held in the clamping device by means of the workpiece holder, e.g. a chip removing processing by means of a processing tool or at least one dimension of the workpiece can be measured by means of a measurement tool.

In embodiments of a clamping device in which an actuation of the operating element is not possible as long as the tool spindle holds the spindle adapter, first the connection between the spindle adapter and the tool spindle can be released after arrangement of the workpiece holder on the clamping device. Subsequently, an appropriate operating movement of the tool spindle can move the operating element from the first position into the second position and thus switch the clamping device into the clamping condition. For example, the spindle adapter can be put down in an empty storing location and there the connection to the tool spindle can be released prior to switching the clamping device in the clamping condition. Subsequently, the tool spindle can move the operating element.

In case a processing tool is used, the workpiece can be machined, e.g. in a chip-removing manner. The processing tool can be rotatably driven around the spindle axis, for example. Thus, the workpiece can be machined by drilling and/or milling and/or grinding or in any other manner by means of the tool. Additionally or alternatively, also a measurement tool can be arranged in one of the storing locations by means of which the processed workpiece can be measured in one or multiple dimensions. For example, the measurement tool can be a tactile or contactless operating probe.

In general arbitrarily configured tools can be picked up and used for carrying out actions on the workpiece. Thereby also a tool change can be carried out and multiple tools can be subsequently used for carrying out actions on the workpiece.

Therefore, all operations can be carried out by means of the tool spindle. Additional devices for transport of tools or workpieces between the tool spindle and the storing locations (e.g. in the magazine unit) or for operating the clamping device are not necessary. The clamping and releasing of the workpiece holder can be carried out by means of operation of the clamping device by means of the tool spindle according to the invention. The machine tool does not require controllable machine clamping devices for this purpose, but can be switched between the clamping condition by means of an electric motor or pneumatically or hydraulically. According to the invention, automatic machining processes with automatic tool change and automatic workpiece change can be exclusively carried out by means of the tool spindle of the machine tool according to the invention. For example, the method is suitable for the automatic processing of similar workpieces in the context of a small batch.

It is advantageous, if the connection between the spindle adapter and the workpiece holder is releasable, e.g. a releasable latch connection. In doing so, the possibility exists to release the connection between the spindle adapter and the workpiece holder and to put down the spindle adapter in the magazine unit. The accessibility to the workpiece can be improved by removing the spindle adapter. The release of the connection between the spindle adapter and the workpiece holder can be carried out by means of a relative movement between the spindle adapter and the workpiece holder, particularly by means of a rotational movement around the spindle axis.

It is advantageous, if the movement of the operating element from a first position into a second position is carried out during or after the release of the connection between the spindle adapter and the workpiece holder by means of a relative movement that is preferably continued without interruption, in order to switch the clamping device from the release condition into the clamping condition. This movement can particularly be a continued rotational movement around the spindle axis. Thereby the spindle adapter preferably engages the operating element.

It is preferred, if the tool is put down in one of the storing locations after having carried out the processes on the workpiece and subsequently the operating element of the clamping device is operated by means of the tool spindle in order to bring the clamping device into the release condition. Thereby particularly a rotation movement around the rotation axis of the operating element can be carried out. The operating direction, e.g. the sense of rotation, for switching the clamping device from the clamping condition into the release condition is opposite to the movement direction of the operating element in which the clamping device can be switched from the release condition into the clamping condition.

Particularly, the switching of the clamping device into the release condition by movement of the operating element from the second position into the first position can be carried out by means of a respective movement of the tool spindle, particularly by means of a rotation movement around the spindle axis. It is advantageous, if the spindle adapter is held in the tool spindle for this purpose and engages the operating element. In doing so, it is possible to establish the connection between the spindle adapter and the workpiece holder prior to or during the switching of the clamping device into the release condition, such that the workpiece holder with the processed workpiece can be removed from the clamping device and can be put down, for example, in one of the empty storing locations.

For processed workpieces, also workpieces on which any action has been carried out in the machine tool, other storing locations can be provided then for tools or workpieces that have to be processed yet, for example. A magazine unit can have different magazine portions for this purpose, for example.

In an embodiment in which the operation of the operating element is not carried out by means of the spindle adapter, the tool spindle can pick up an operating tool prior to operating the operating element. For example, the operating tool can comprise a pin, particularly a cylindrical pin. By means of the operating tool the operating element can be operated or moved in a particularly simple manner, e.g. if the operating element is an operating lever.

In an embodiment the operating element can be an operating lever. The operating lever is preferably pivotably supported around a rotation axis. It is advantageous, if an eccentric body is movably coupled and particularly torque-proof connected with the operating lever. The eccentric body and the operating lever can form a common part and can be connected monolithically with each other. The eccentric body can have a cam surface against which a movably supported slider of the operating device can abut, analog to an embodiment of the clamping device according to the invention described above. During a pivot movement of the operating lever around the rotation axis the eccentric body carries out an eccentric movement that in turn effects a displacement of the slider.

In this embodiment multiple clamping bodies can be movably coupled with the slider that can be moved thereby between a clamping condition and a release condition. The movement coupling between the clamping bodies and the slider can be realized, for example, by means of a transmission, particularly by means of a wedged surface arrangement.

The clamping device can have a base with a top side and a bottom side. The base has a support surface on the top side into which preferably holes open out for locating of one holding bolt therein respectively. The holding bolts are arranged on a workpiece holder and project, for example, parallel to one another from a bottom side of the workpiece holder. During placing the workpiece holder on the clamping device the holding bolts engage into one assigned hole on the base respectively. In doing so, a form-fit connection between the base of the clamping device and the workpiece holder in circumferential direction around the spindle axis as well as orthogonal to the spindle axis is established that can be subject to play in the release condition of the clamping device. This allows a movement of the spindle adapter orthogonal to the spindle axis or in circumferential direction around the spindle axis in order to establish or release a releasable connection between the spindle adapter and the workpiece holder. The workpiece holder is thereby supported in the holes of the base by means of the holding bolts.

The releasable connection between the spindle adapter and the workpiece holder can be a latch connection, for example.

On its bottom side the base can have multiple holding bolts, the shape and dimension of which correspond particularly to the holding bolts that can be provided on the workpiece holder. The machine clamping device can comprise holes that can be engaged by the holding bolts of the base and in which the holding bolts can be held by clamping in a form-fit and/or force-fit manner.

Therefore, the same clamping principle or clamping system can be used between the clamping device and the machine clamping device on one hand and between the clamping device and the workpiece holder on the other hand.

It is advantageous, if the clamping connection between the machine clamping device and the clamping device is maintained during the processing of one or more workpieces continuously.

In the configuration of the clamping device according to the invention, the movement of the operating element is particularly carried out by means of a rotation movement of the spindle adapter by means of the tool spindle. In another embodiment of the clamping device that can be used in the method according to the invention, the tool spindle can be moved along at least one arbitrary path curve for operating the operating element. For example, the at least one path curve can extend in a plane that is orientated orthogonal to the height axis of the clamping device or to the rotation axis of the operating element. In an embodiment the tool spindle can be moved along a first path curve in order to bring the clamping device into the clamping condition and/or along a second path curve in order to bring the clamping device into the release condition. The first path curve and the second path curve can be different from one another.

The first path curve and/or the second path curve can have a curved profile at least in one section and/or a straight profile in at least one section. In an embodiment the first path curve and/or the second path curve can be a traverse from multiple straight sections. Such movements of the tool spindle along straight sections of a traverse can be realized very simply. In another embodiment the first path curve and/or the second path curve can be continuously curved, e.g. a circular arc.

In an embodiment the spindle adapter can comprise a hollow cylindrical outer wall that surrounds the workpiece holder or the workpiece held on the workpiece holder. However, also other arbitrary embodiments of the spindle adapter can be used, particularly in the context of the method according to the invention. In an embodiment the spindle adapter can be configured and constructed to engage the operating element. In other embodiments of the method according to the invention in which the operation of the operating element is not carried out by means of the spindle adapter, spindle adapters can be used that do not have to be configured for operation of the operating element.

In an embodiment the spindle adapter has two arms. A latch device is provided on each arm. Each latch device is engaged with a counter latch device of the workpiece holder, if the connection with the workpiece holder is established. The counter latch devices of the workpiece holder are arranged on the outside of the workpiece holder, e.g. in corner regions of the workpiece holder arranged diagonally opposite one another. If the latch connection is established, the counter latch devices or latch devices are preferably arranged opposite one another respectively relative to the spindle axis.

BRIEF DESCRIPTION OF THE FIGURES

Advantageous embodiments of the invention are derived from the dependent claims, the description and the drawing. In the following, preferred embodiments of the invention are explained in detail with reference to the attached drawing. The drawings show:

DETAILED DESCRIPTION

Figure 1:
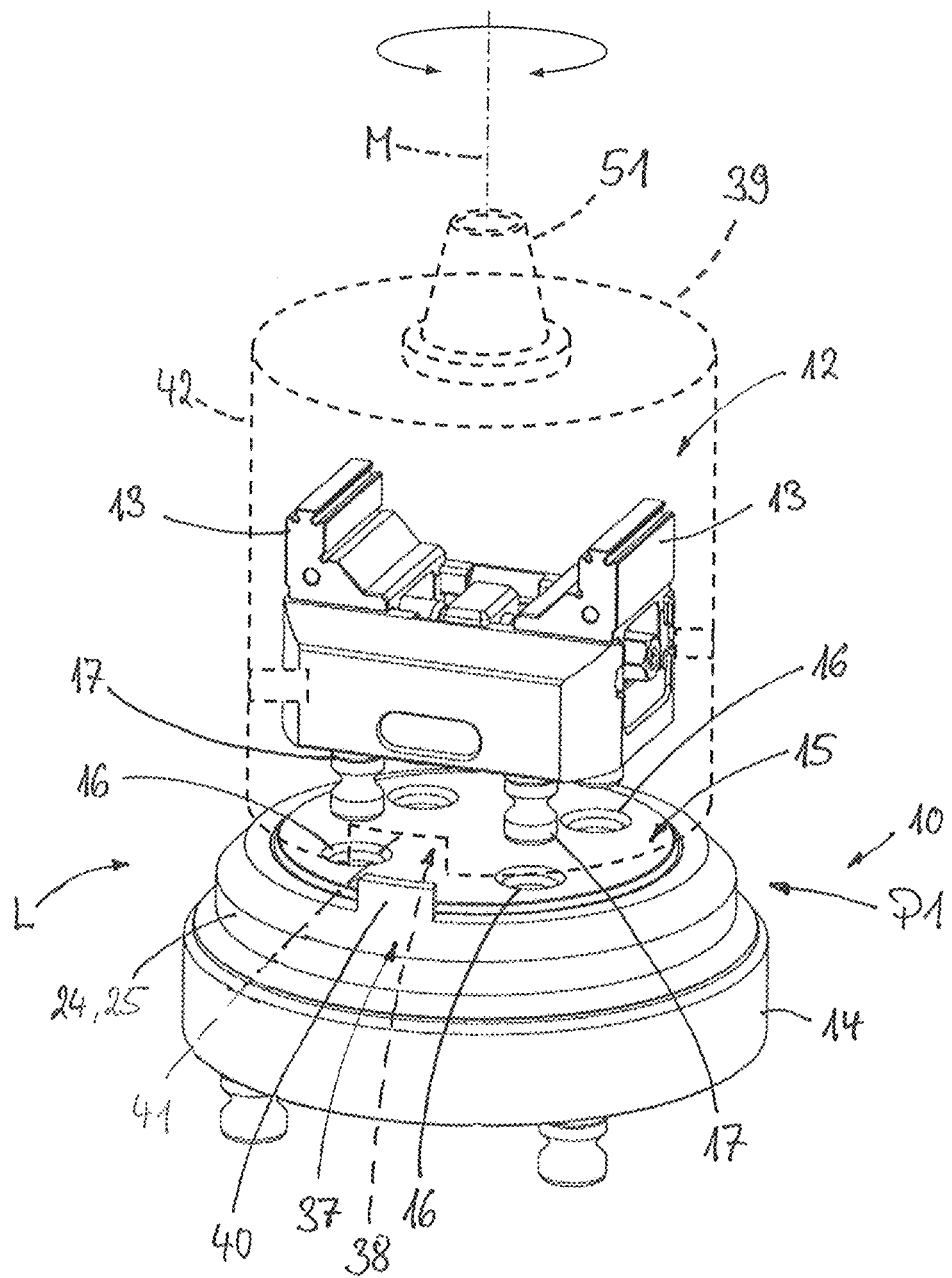
FIG. 1 an embodiment of a clamping device according to the invention as well as a workpiece holder and a spindle adapter in a perspective view, FIG. 2 a perspective view of the clamping device according to FIG. 1 in a release condition, FIG. 3 a perspective view of the clamping device of FIGS. 1 and 2 in a clamping condition, FIG. 4 an operating device of the clamping device of FIGS. 1-3 in a release condition based on a cross-section along the cutting plane IV in FIG. 2, FIG. 5 the operating device of the clamping device of FIGS. 1-3 in a clamping condition based on a cross-section along the cutting plane V in FIG. 3, FIG. 6-14 a block diagram in each case of a machine tool comprising a tool spindle and a clamping device, whereby different stages of an embodiment of a method according to the invention during the processing of a workpiece are illustrated, FIG. 15-19 a block diagram of a machine tool in each case comprising a tool spindle and a clamping device, wherein different stages of another embodiment of a method according to the invention during processing of a workpiece are illustrated, FIG. 20 a perspective illustration of a clamping device that can be used in the method of the invention according to FIGS. 15-19 having a workpiece holder arranged thereon, FIG. 21 a schematic block-diagram-like basic illustration of an operating device of the clamping device according to FIG. 20, FIGS. 22 and 23 a basic illustration respectively for illustrating establishment of a connection between a holding bolt of a workpiece holder and a clamping body of the clamping device, FIG. 24 a schematic basic illustration of an embodiment of a spindle adapter with latch devices and a workpiece holder with counter latch devices for establishment of a releasable latch connection, FIGS. 25 and 26 a schematic cross-section illustration respectively of a modified embodiment of a latch device for the spindle adapter and a counter latch device for the workpiece holder, FIGS. 27-29 another embodiment of a clamping device in different illustrations in a release condition and FIGS. 30-32 the embodiment of the clamping device of FIGS. 27-29 in a clamping condition.

The invention refers to a clamping device 10 as well as a method for handling of workpieces 11 that can be clamped or held by means of a workpiece holder 12. The workpiece holder 12 is particularly a vice or spindle vice with two jaws 13 that can be moved toward or away from each other. In FIGS. 1-5 an embodiment of clamping device 10 according to the invention is shown in different illustrations.

In the embodiment clamping device 10 has a base 14. On the top side of base 14 a support surface 15 for the workpiece holder 12 is provided. The support surface 15 has a circular contour in the embodiment.

Multiple holes 16 open out in support surface 15 and are thus open toward the top. The holes 16 are arranged with distance to one another in a predefined grid. Only by way of example, four holes 16 are illustrated in FIGS. 1-5. The number of holes can also be higher than four.

Each hole 16 is configured for locating a holding bolt 17 of the workpiece holder 12 therein. As apparent from FIG. 1, the holding bolts 17 project from a bottom side of the workpiece holder 12 that is on the opposite side of jaws 13. The holding bolts 17 extend parallel to one another. They are arranged with distance to one another that matches with the grid of holes 16. In the embodiment the workpiece holder comprises four holding bolts 17. When arranging the workpiece holder 12 on the support surface 15 each holding bolt 17 engages one of the holes 16.

Figure 22:
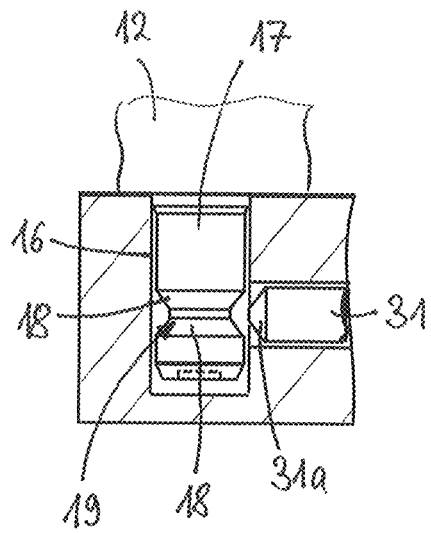
Figure 23:
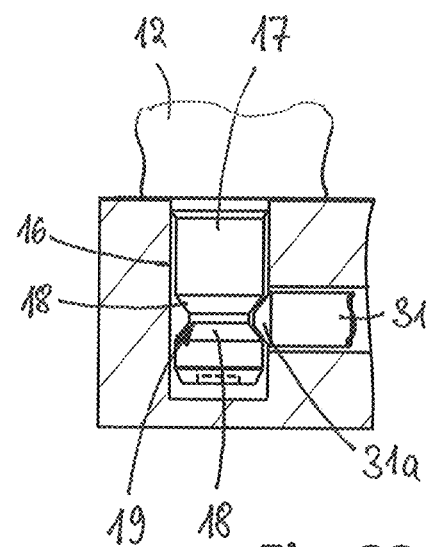

For example, the holding bolts are apparent from FIGS. 1, 4-20 and shown in basic illustrations in FIGS. 22 and 23. Each holding bolt 17 has two adjacent sections in the area of which the cross-section of the holding bolt 17 narrows, according to the example conically. In the embodiment the holding bolt 17 has two conical surfaces 18 for this purpose. The two conical surfaces 18 can adjoin directly to each other or can be connected via a section, particularly a cylindrical section, with one another alternatively, as apparent from FIGS. 22 and 23. In the area of the conical surfaces 18 the holding bolt 17 forms a ring groove 19 that has a triangular cross-section or—as in the embodiment-a trapezoidal-shaped cross-section. All of the holding bolts 17 are configured identically.

Figure 3:
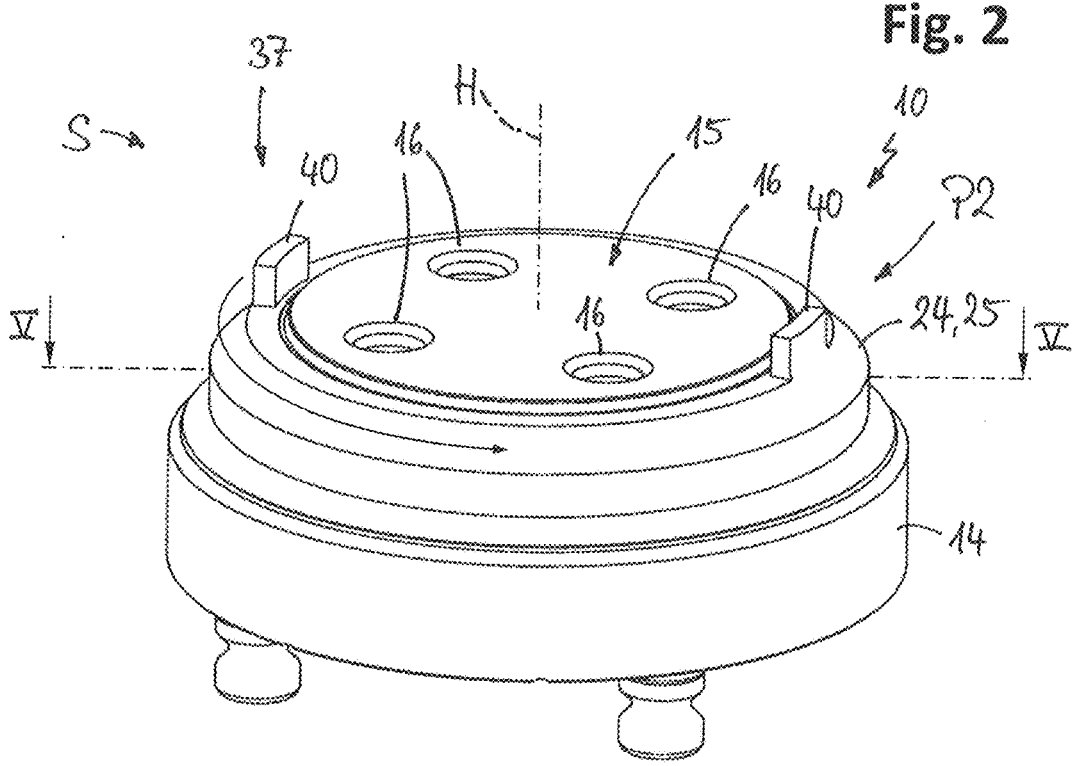
Figure 4:
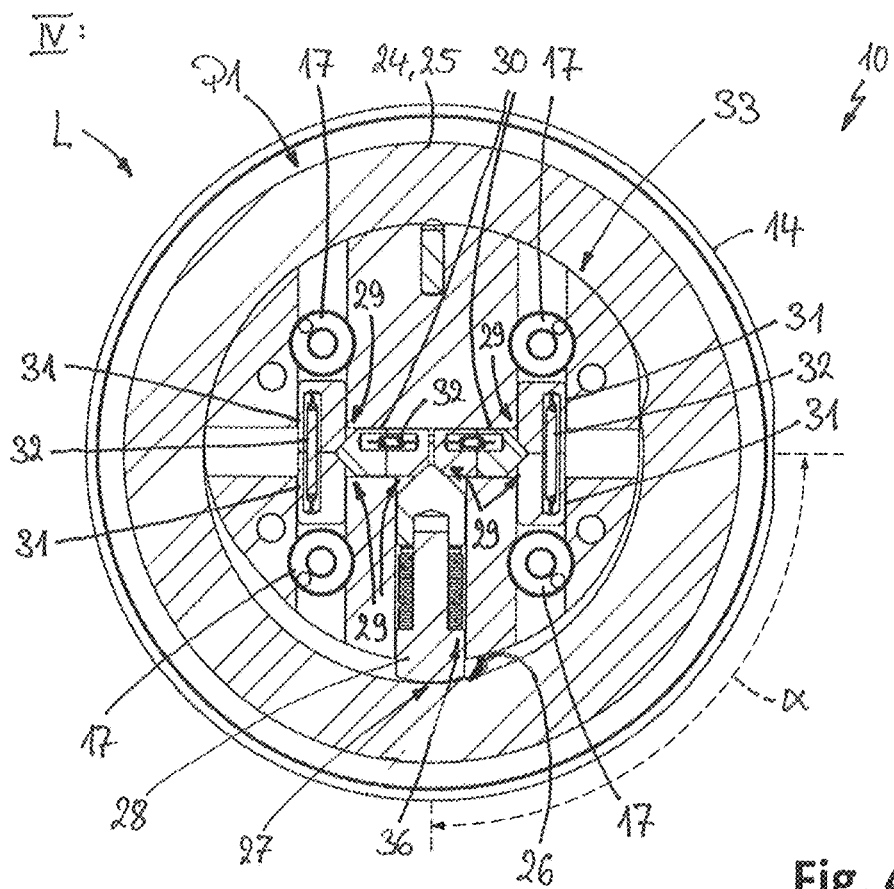
Figure 5:
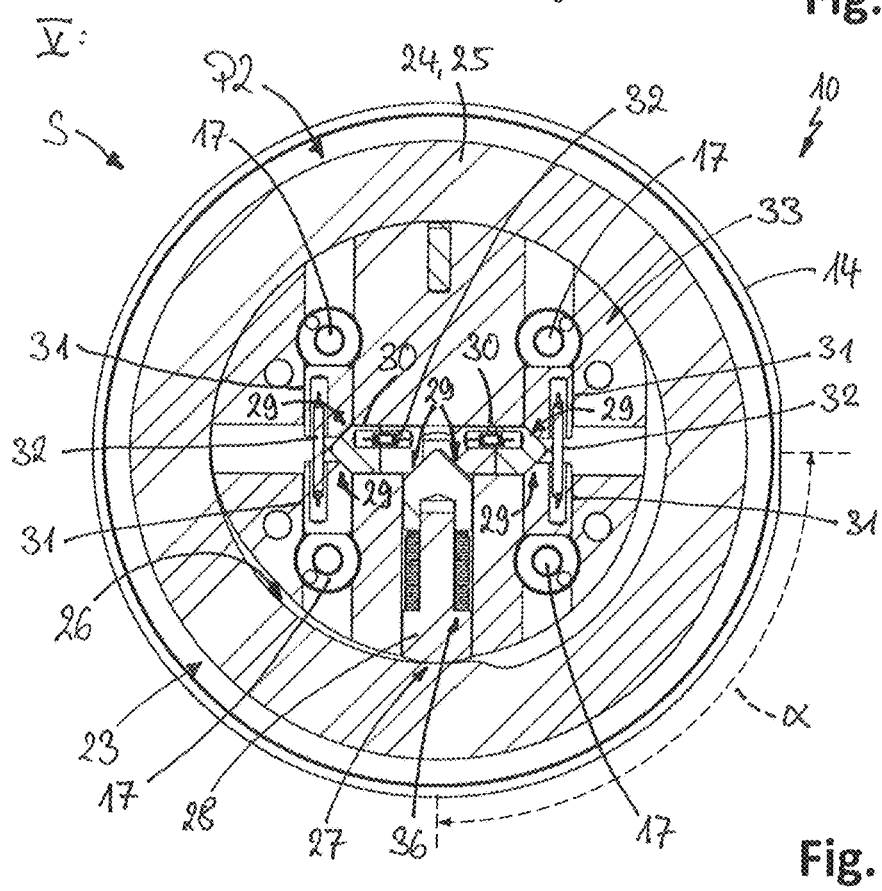

On or in the base 14 of clamping device 10 an operating device 23 is arranged that is shown in the cross-sectional illustrations of the clamping device 10 (FIGS. 4 and 5). The clamping device 10 can be switched between a release condition L (FIGS. 1, 2, 4 and 27-29) and a clamping condition S (FIGS. 3, 5 and 30-32) by means of the operating device 23. For operation the operating device 23 comprises an operating element 24 arranged on the base 14 and accessible from outside. The operating element 24 is movable between a first position P1 and a second position P2 along a path around a height axis H of clamping device 10. In the embodiments illustrated in FIGS. 1-5 and 27-32 the path is a circular path or a circular arc-shaped path around the height axis H. Therefore, the path is arranged coaxially to height axis H. As apparent in FIGS. 1-5 and 27-33, the operating element 24 is realized as operating ring 25 in these embodiments that is arranged coaxially to the height axis H. The operating ring 25 surrounds support surface 15 and according to the example, in addition the further components of the operating device 23. The height axis H intersects the support surface 15.

In modification to the illustrated embodiment the operating element 24 can also be a ring segment or another body that is movably arranged on the base 14 and can be moved along the path around the height axis H.

The operating device 23 comprises multiple clamping bodies 31, wherein one clamping body 31 is assigned to each hole 16. In the clamping condition S a clamping end 31a of the respective clamping body 31 projects into the hole 16 such that a holding bolt 17 arranged therein is applied with a clamping force. In the release condition L the clamping body 31 is retracted from the assigned hole 16, such that its clamping end 31a allows the insertion and the removal of a holding bolt 17 into or out of hole 16 in an unimpeded manner.

The operating device 23 has in addition a coupling device 33 that is configured to establish a movement coupling between the operating element 24 and the clamping bodies 31. The coupling device 33 can be realized in different ways. In the embodiments according to FIGS. 1-5 as well as 27-32, the coupling device 33 comprises a cam follower arrangement having a cam surface 26 and according to the example, in addition at least one wedge surface pair 29 in order to establish the movement coupling between the operating element 24 and the clamping bodies 31. Alternatively to this also other transmission arrangements for movement coupling could be used.

In the embodiments illustrated in FIGS. 1-5 and 27-32 the coupling device 33 comprises at least one slider 28 that is slidably supported in the base 14. The at least one slider 28 is slidably supported orthogonal and particularly radially relative to the height axis H in the embodiment. Each slider 28 can be brought into direct or indirect contact with the operating element 24 at an abutment site 27. The movement coupling between the operating element 24 and the at least one slider 28 is realized by means of a cam follower arrangement having a cam surface 26 that can be arranged either on the operating element 24 (FIG. 1-5) or alternatively on the at least one slider 28 (FIGS. 27-32). The cam surface 26 arranged on the operating element 24 according to the embodiments of FIGS. 1-5 is arranged on the inner side facing toward the height axis H, wherein the cam surface 26 forms the ring inner surface of the operating ring 25 according to the example. In the embodiment according to FIGS. 27-32, each slider 28 comprises a cam surface 26 that faces away from height axis H and faces the operating element 24 or the operating ring 25.

Cam surface 26 has an eccentric profile around height axis H such that it deviates from a circular shape or circular arc shape around the height axis H. Depending on where the abutment site 27 is located along the respective cam surface 26, the slider 28 takes different positions relative to the height axis H, such that a movement of the operating element 24 can be transferred into a linear displacement of the at least one slider 28 in order to switch clamping device 10 between the release condition L and the clamping condition S.

With reference to FIGS. 1-5 at least the embodiment is explained in which the at least one cam surface 26 is arranged on the operating element 24 or the inner side of operating ring 25. The cam surface 26 can extend along 360° around height axis H. However, it is sufficient, if the cam surface 26 extends in an angular range α around height axis H that is less than 360° and can be, for example, approximately 90°. This angular range α is at least as large as the angle about which the operating element 24 can be rotated between the first position P1 and the second position P2 around height axis H.

In the embodiment the distance of cam surface 26 from height axis H varies along the extension of cam surface 26. In the embodiment cam surface 26 has a profile that corresponds to a section of a spiral winding.

At the abutment site 27 the slider 28 of operating device 23 abuts against cam surface 26 of operating element 24. At its end opposite the abutment site 27, slider 28 is abuts against movably supported wedge bodies 30 via one wedge surface pair 29 in each case. The wedge surfaces of the wedge surface pair 29 extend obliquely to the movement direction of slider 28 respectively and obliquely to the movement direction of the wedge bodies 30. In the embodiment the wedge bodies 30 are movably supported in a direction that is orthogonal to the movement direction of slider 28. Wedge bodies 30 can move away from each other or toward each other. The end of slider 28 opposite the abutment site 27 projects into the interstice between the two wedge bodies 30 and can move them away from each other, if slide 28 is further moved into this interstice, wherein slider 28 allows movement of the two wedge bodies 30 toward each other during retraction out of the interstice.

Each wedge body 30 has an end opposite the slider 28 that in turn abuts against at least one-according to the example two-clamping bodies 31 of operating device 23. As apparent from FIGS. 4 and 5, each wedge body 30 abuts against the assigned clamping bodies 31 by means of one wedge surface pair 29 in each case. The wedge surfaces of the wedge surface pair 29 extend obliquely to the movement direction of the wedge bodies 30 and obliquely to the movement direction of the clamping bodies 31.

The two clamping bodies 31 that abut against one common wedge body 30 can be moved toward each other or away from each other and are movably supported for this purpose. The movement direction of the clamping bodies 31 is according to the example, parallel to the movement direction of slider 28. Each wedge body 30 projects with its end opposite slider 28 into an interstice between the two assigned clamping bodies 31 and can move them away from each other, if the wedge body 30 is moved further into the interstice or can allow a movement of the two clamping bodies 31 toward each other, if the wedge body 30 is moved out of this interstice.

The two wedge bodies 30 are urged toward each other by means of a preloading device 32, such that they are urged against the end of slider 28. Analog to this the two clamping bodies 31 that are assigned to a common wedge body 30 are urged toward each other by means of a preloading device 32 and abut against the end of the wedge body 30 arranged therebetween. By means of the preloading devices 32, a retraction movement of the two clamping bodies 31 or the two wedge bodies 30 toward each other can be effected.

Each preloading device 32 can create a tensile force between the two clamping bodies 31 or between the two wedge bodies 30 respectively. The preloading device 32 can be connected with the two bodies 30 or 31 between which the tensile force shall be created. Each preloading device 32 can comprise a component creating a tensile force for this purpose, e.g. a tensile spring.

Each clamping body 31 has a clamping end 31a (compare FIGS. 22 and 23) that is assigned to a hole 16 in the base. The clamping end 31a is arranged opposite the end at which clamping body 31 abuts against wedge body 30.

With reference to FIGS. 4, 5, 22 and 23 the operating device 23 operates as follows:

In the first position P1 of operating element 24 the clamping bodies 31 are in a retraction position in which the clamping end 31a are substantially or completely arranged outside of hole 16 such that the unimpeded insertion and removal of holding bolts 17 in or out of the respective hole 16 is allowed (FIGS. 4 and 22). If operating element 24 is moved after insertion of holding bolts 17 in the assigned hole 16 from the first position P1 into the second position P2 (FIG. 5), slider 28 is further proceeded between wedge bodies 30 that in turn are moved away from each other. This results in that the wedge bodies 30 are moved into the interstice between the two assigned clamping bodies 31 respectively and the clamping bodies 31 of a respective clamping body pair are in turn moved away from each other into an extended position in which at least the clamping end 31a projects into the respectively assigned hole 16. On the level of the clamping end 31a, holding bolt 17 has the ring groove 19 into which the clamping end 31a engages, which is particularly apparent from FIG. 23. Thereby clamping end 31a can particularly apply a tensile force on the holding bolt 17, according to the example in that clamping end 31a engages the lower conical surface 18. In this manner the workpiece holder 12 is clamped or drawn against support surface 15.

Concurrently the two holding bolts 17 on which a holding force is applied by one common clamping body pair are urged away from each other against the wall of base 14 limiting hole 16. In this manner the workpiece holder 12 can be clamped very precisely in a desired position by means of clamping device 10.

For releasing the workpiece holder 12, the operating element 24 is moved from the second position P2 back into the first position P1. Due to the restoring force of the preloading devices 32, the two clamping bodies 31 of a common clamping body pair as well as the two wedge bodies 30 are urged toward each other respectively and thereby move slider 28 always against cam surface 26 at the respective abutment site 27. If the distance of the cam surface 26 from the height axis H increases during movement from the second position P2 into the first position P1, slider 28 moves out of the interstice between the wedge bodies 30 in doing so, such that the wedge bodies 30 can move closer to one another. This results in turn in that the wedge bodies 30 can move out of the interstice of the clamping body pairs and the clamping bodies 31 of each clamping body pair can move toward each other. The clamping ends 31a move partly or completely out of the hole 16 and release in this manner the holding bolts 17.

The operating element 24, according to the example the operating ring 25, is movably coupled with the clamping bodies 31 in order to move them between the retracted position (release condition L of clamping device 10) and the extended position (clamping condition S of clamping device 10). This movement coupling is achieved by means of slider 28, wedge bodies 30 and the respective wedge surface pairs 29. Instead of a wedge surface arrangement having multiple wedge surface pairs 29, also another movement coupling can be realized by means of known transmission elements, such as toothed wheels, toothed racks, etc.

The modified embodiment of clamping device 10 or the operating device 23 shown in FIGS. 27-32 is constructed according to the same principles in terms of the movement coupling as the operating device 23 described above. An important difference between these embodiments is that the operating device 23 according to FIGS. 27-32 comprises two separate sliders 28 that are arranged diametrically opposite to one another relative to height axis H and are movably supported toward each other and away from each other. Each slider 28 is movably coupled with at least one and according to the example, two clamping bodies 31. At its back side facing the operating element 24 and according to the example, the operating ring 25, each slider 28 comprises a cam surface 26 that extends eccentrically around height axis H. As apparent from FIGS. 28 and 29, a contact can be established between operating element 24 and sliders 28 in the release condition L, however, preferably a distance is present and a contact is only established, if the operating element 24 is moved out of its first position P1 into direction of second position P2. Therefore, it may well be that there is no abutment site 27 between the operating element 24 and the respective slider 28 yet in the release condition L.

In order that cam surface 26 comprises a sufficient length in extension direction around height axis H, each slider 28 comprises an end piece 34 extending in an arc-shaped manner around height axis H. According to the example, the end piece 34 can be configured symmetrically to a longitudinal center plane through the slider 28. The longitudinal center plane through slider 28 extends also through height axis H according to the example.

For abutment against the cam surfaces 26 of sliders 28 the operating element 24 comprises roller bodies 35, according to the example, that are rotatably supported around an axis extending parallel to height axis H. One roller body 35 is assigned to each slider 28 or each cam surface 26. During movement of the operating element 24 each roller body 35 can roll on the assigned cam surface 26. Due to a roller body support in this manner between operating element 24 and the at least one slider 28, the torque or the force can be reduced that is necessary in order to move the operating element 24 between the first position P1 and the second position P2. Such a roller body bearing can also be used in other embodiments of clamping device 10, e.g. in the embodiment according to FIGS. 1-5. There a roller body 35 could be arranged on the end of slider 28 assigned to operating element 24.

Figure 27:
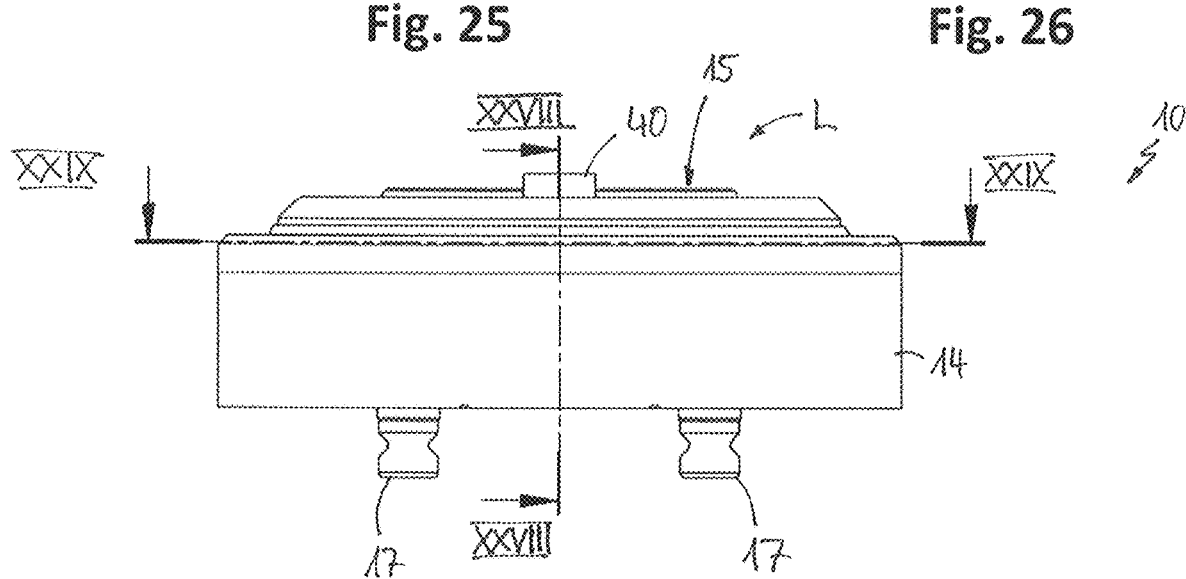
Figure 28:
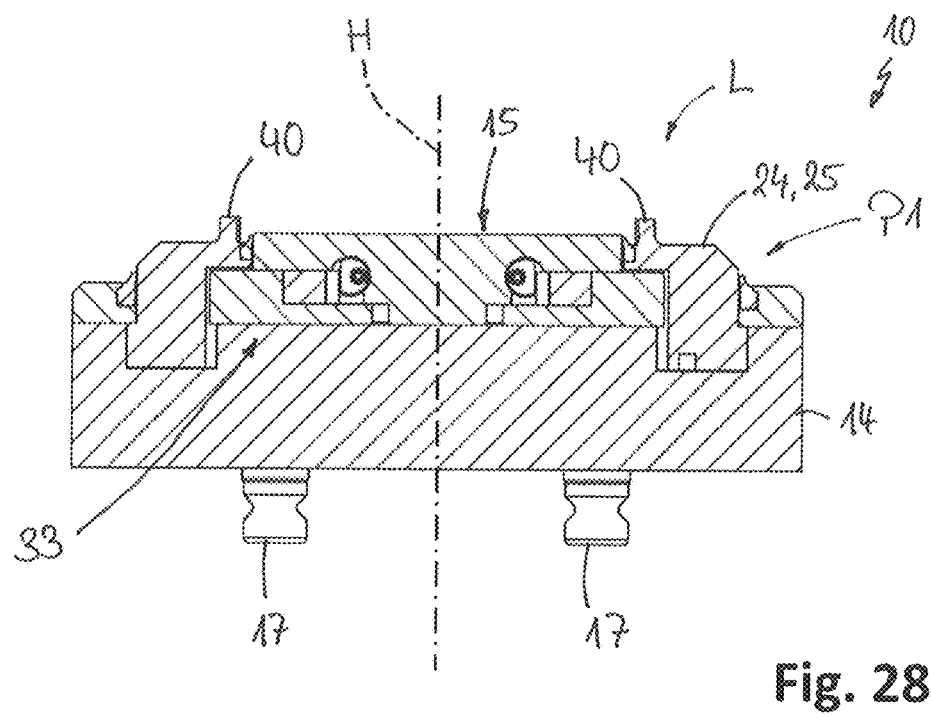
Figure 29:
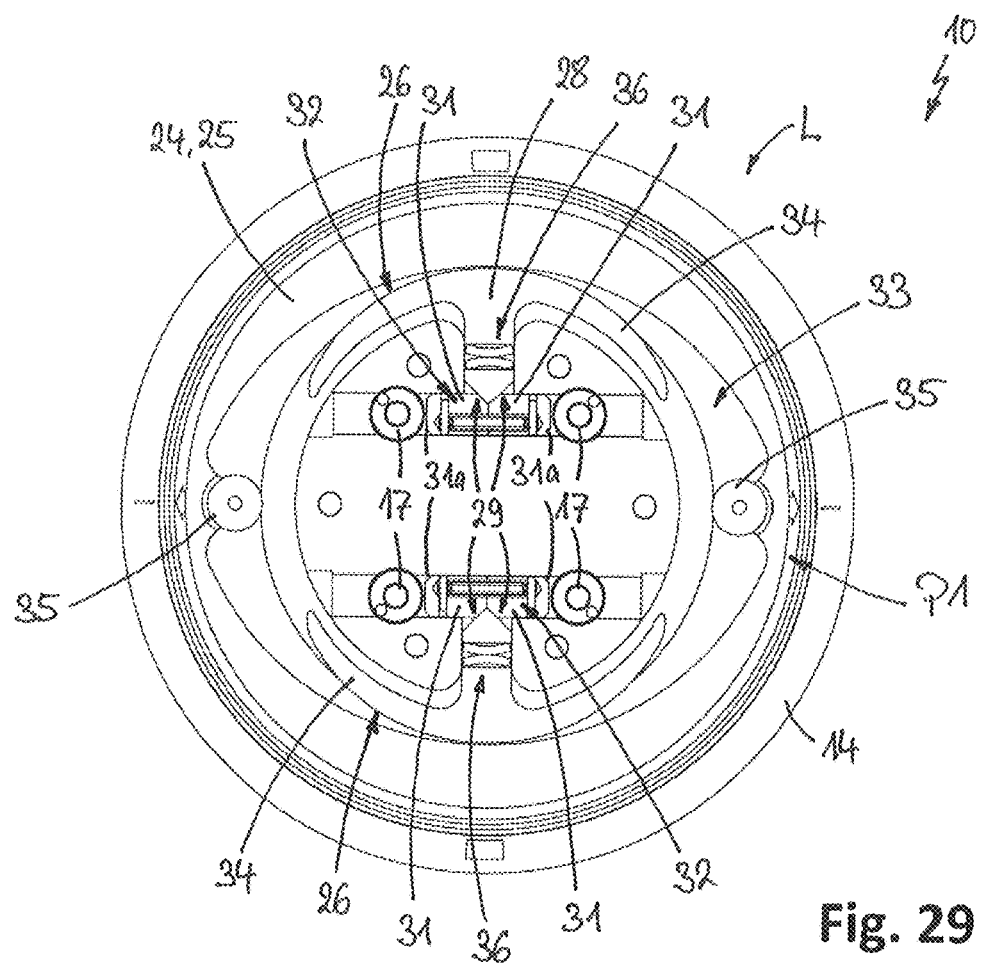
Figure 30:
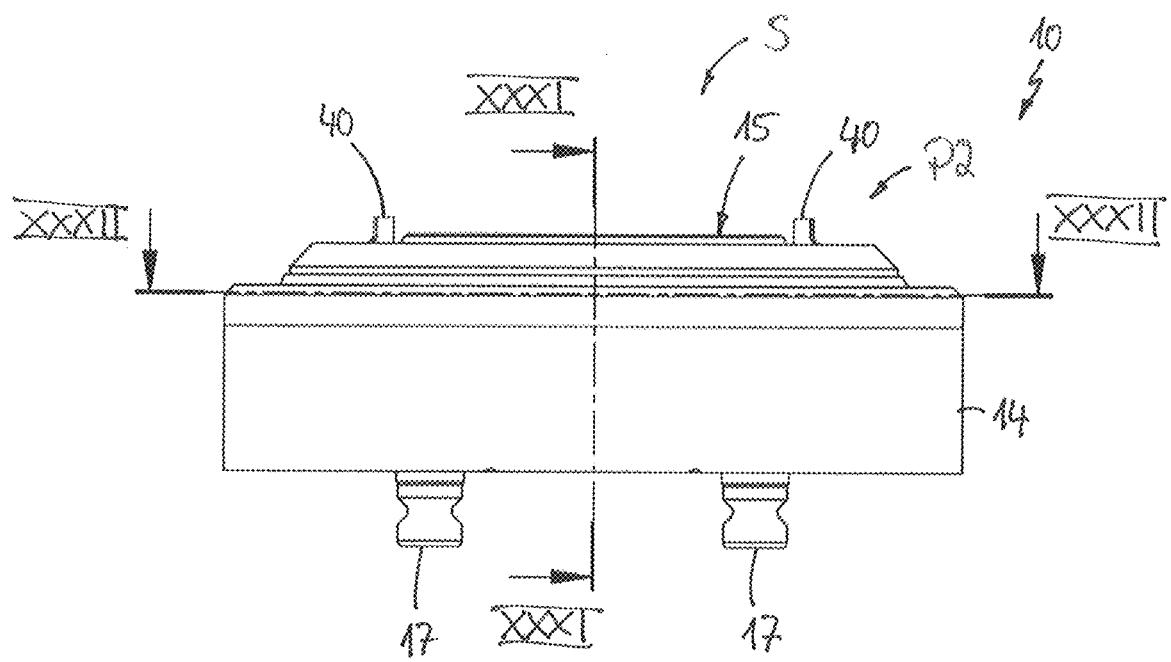
Figure 31:
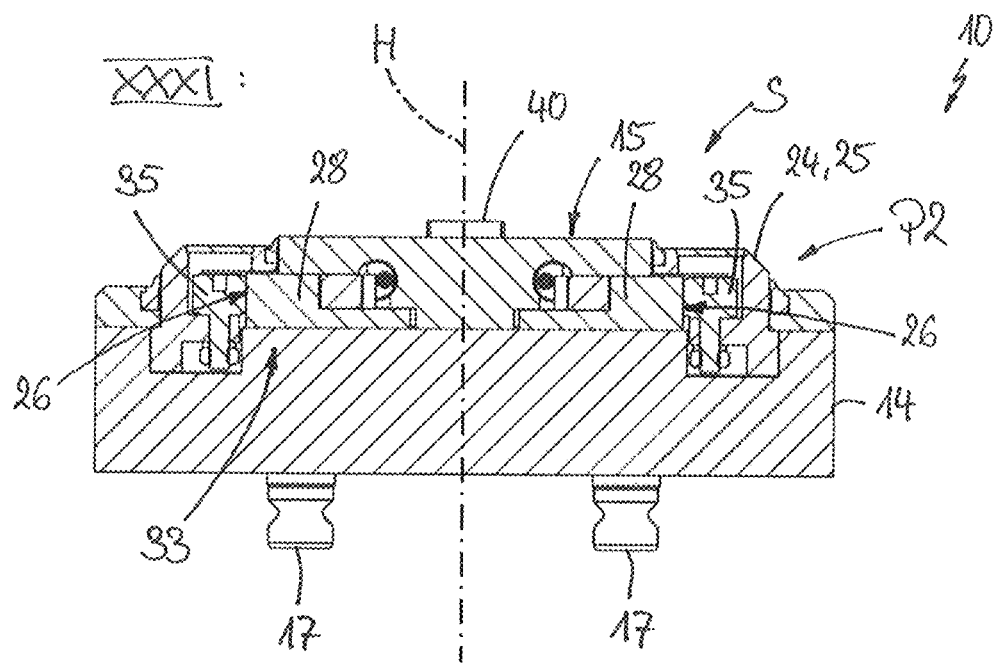
Figure 32:
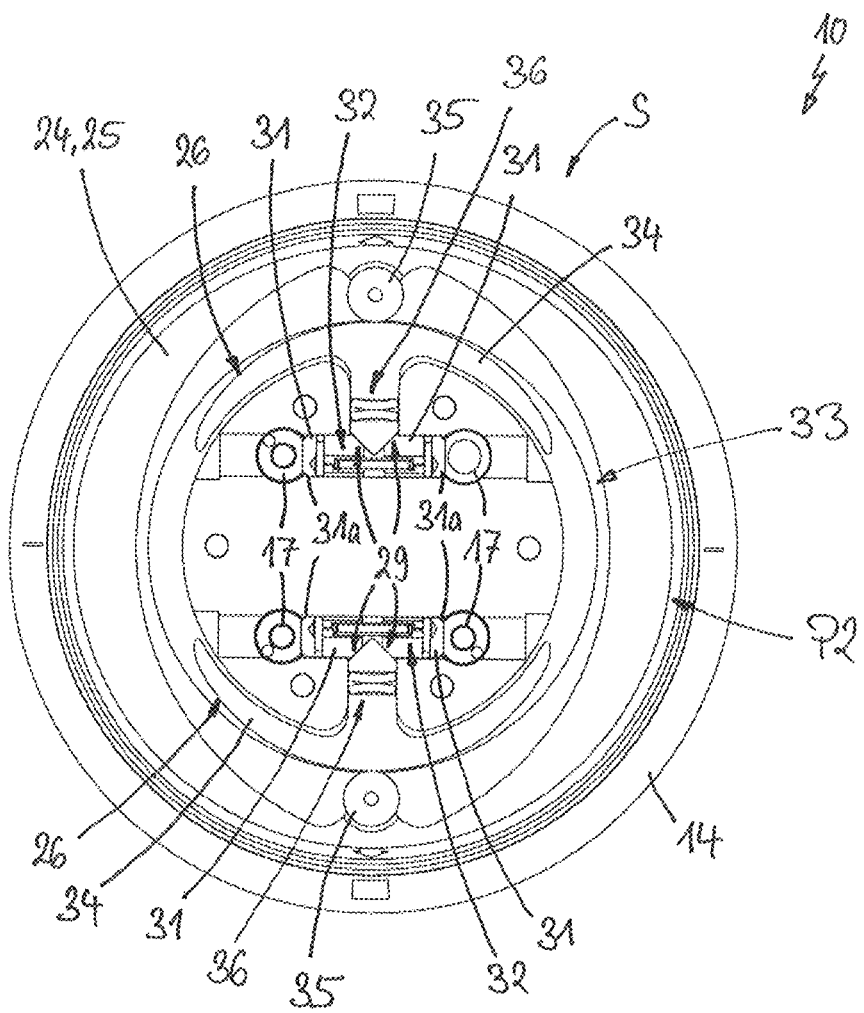

In the modified embodiment according to FIGS. 27-32, the wedge bodies 30 are omitted compared with the embodiment according to FIGS. 1-5 and 20 and 21. Rather the clamping bodies 31 are directly in contact with the end of the assigned slider 28 that is arranged opposite to the operating element 24, wherein the direct contact between the clamping bodies 31 and the slider 28 is realized by means of a respective wedge surface pair 29. Each slider 28 is in abutment with two clamping bodies 31 via a respective wedge surface pair 29 in a movable manner. The slider 28 can move the two clamping bodies 31 against the preloading force of preloading device 32 away from each other in order to bring the clamping device 10 in the clamping condition S. During a retraction movement of slider 28 out of the interstice between the two clamping bodies 31 they are moved toward each other due to the preloading force of preloading device 32, whereby clamping device 10 can be brought into the release condition L. The release condition L is illustrated in FIGS. 27-29 and clamping condition S is illustrated in FIGS. 30-32. For sake of clarity the hatch lines of the sectional illustration according to the cutting line XXIX-XXIX in FIG. 27 or according to the cutting line XXXII-XXXII in FIG. 30 have been omitted in FIGS. 29 and 32.

Figure 20:
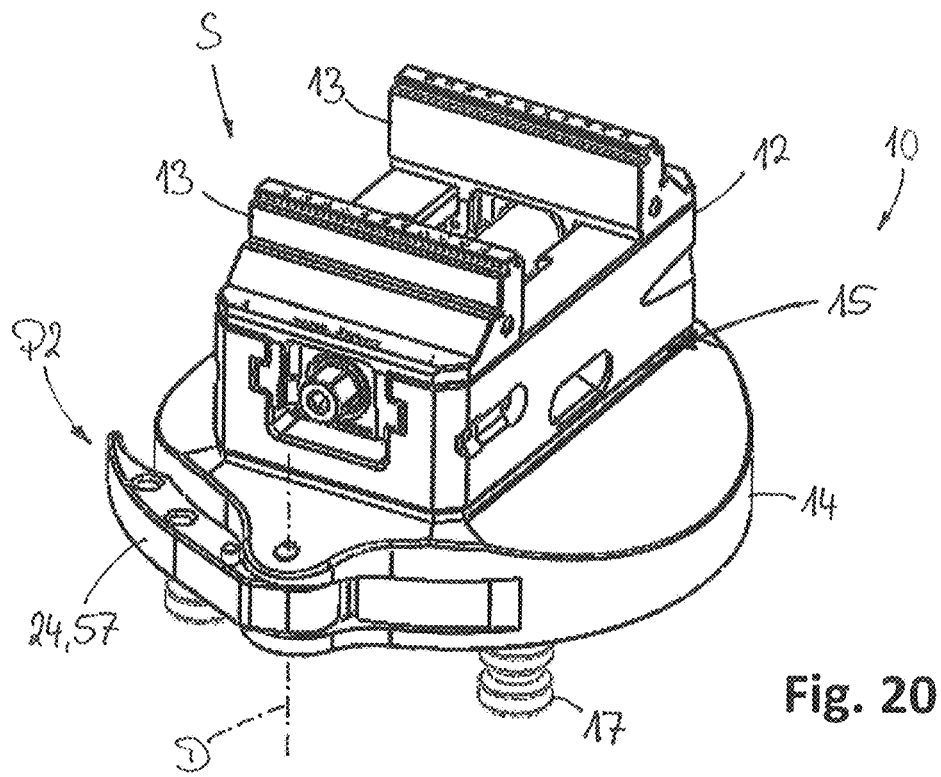
Figure 21:
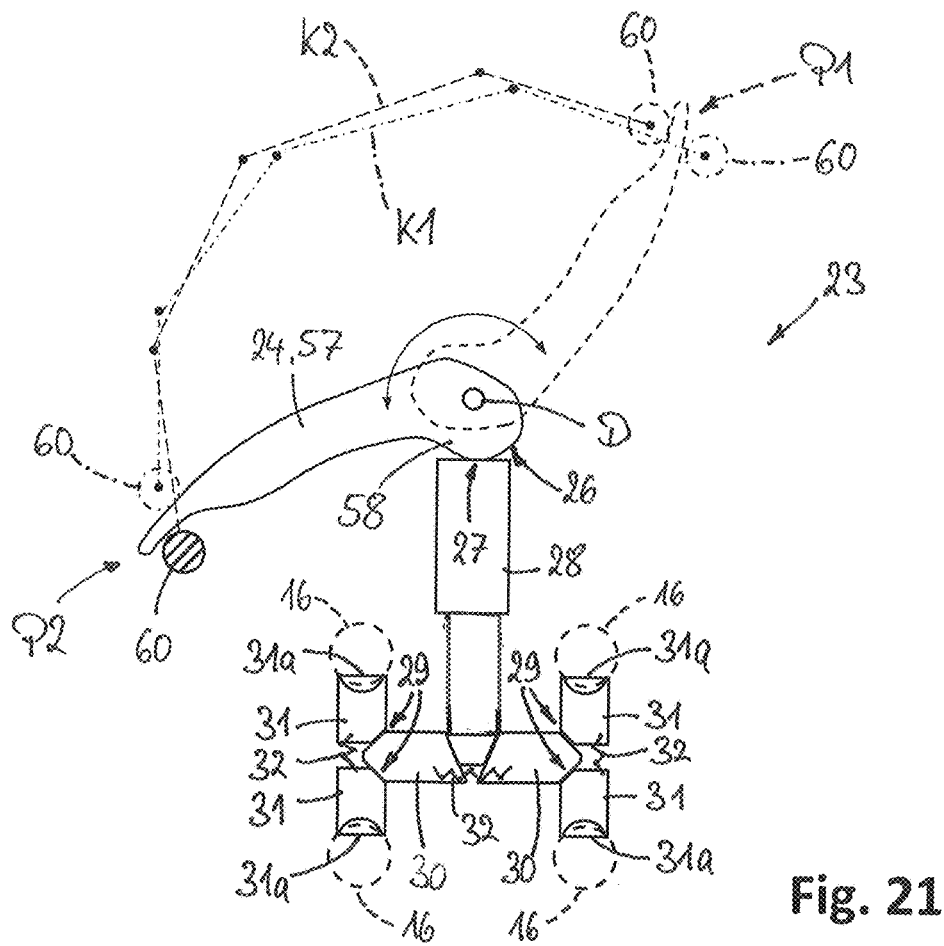

In the embodiments according to FIGS. 1-5 and according to FIGS. 20 and 21 and as an option the wedge bodies 30 can also be omitted, if one slider 28 is present for each pair of clamping bodies 31. Vice versa in the embodiment according to FIGS. 27-32, also only one slider 28 could be provided and then in addition, wedge bodies 30 can be used analog to FIGS. 1-5 and 20-21.

Providing a roller bearing support between the operating element 24 and the at least one slider 28 and/or the omission of wedge body 30 in the coupling device 33 between slider 28 and the assigned clamping bodies 31 contributes to reducing the required forces and torques for operation.

In addition, in all of the embodiments a balancing unit 36 can be provided in the force transmission path between the operating element 24 and the clamping bodies 31. The balancing unit 36 is configured to deform elastically—to compress elastically according to the example—if the force in the force transmission path increases or exceeds a force threshold. The balancing unit 36 can have one or multiple elastically deformable bodies for this purpose, e.g. at least one disc spring, at least one helical spring, at least one deformable plastic body (e.g. hard rubber disc) or an arbitrary combination thereof.

The balancing unit 36 is preferably present in each force transmission path from the at least one slider 28 and the assigned clamping body 31 and can be arranged on each slider 28—as in the embodiments illustrated here. For example, slider 28 can be separated into two slider parts that are movably relative to each other between which the balancing unit 36 is arranged. If the clamping bodies 31 are in abutment with an assigned holding bolt 17 by means of their clamping ends 31a, the increase of the clamping force between the clamping bodies 31 and the holding bolts 17 can be limited based on the spring characteristic curve or the elasticity characteristic curve of the balancing unit 36. In doing so, possible tolerances during manufacturing of the individual components or during assembly are at least partly compensated and the uniformity of clamping of holding bolts 17 is improved.

Figure 2:
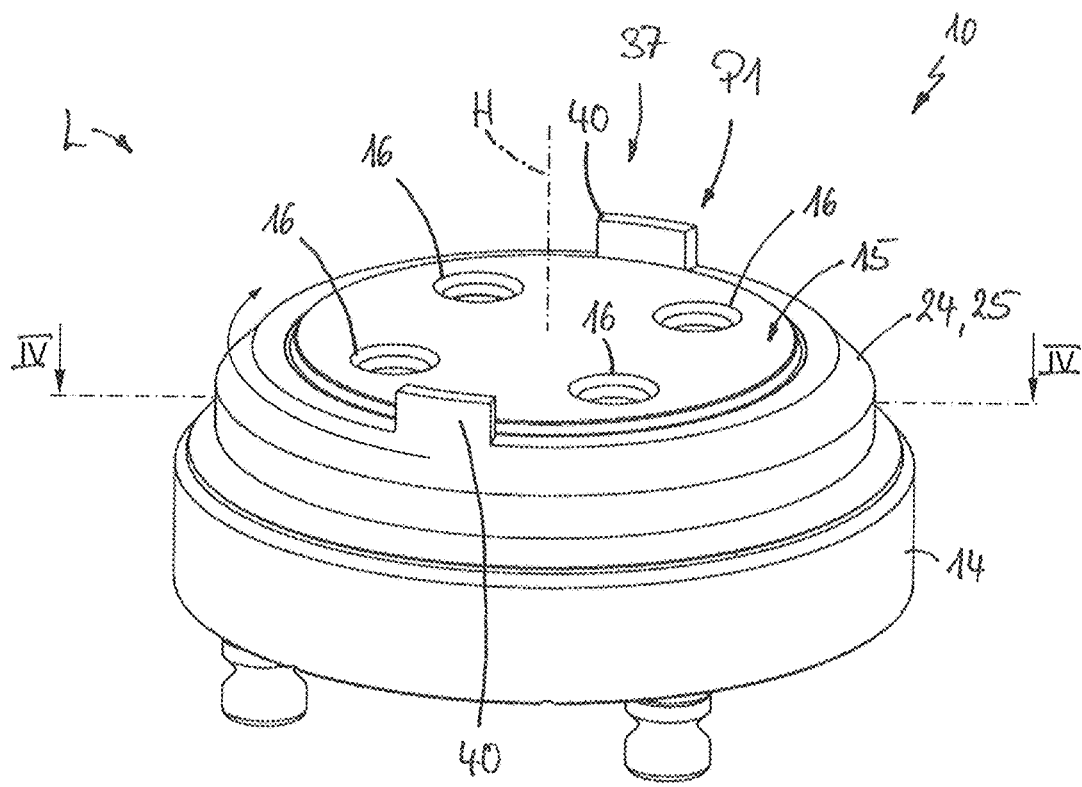

It is in addition apparent from FIGS. 1-3 that operating element 24 comprises a coupling device 37. Coupling device 37 is configured to be releasably coupled with a counter coupling device 38 of a spindle adapter 39 (shown in dashed lines in FIG. 1). If the connection is established, a torque-proof coupling between spindle adapter 39 and operating element 24 is created in movement direction of operating element 24 around height axis H. In the embodiment the connection is established or separated by means of a relative movement between spindle adapter 39 and operating element 24 parallel to the height axis H.

In the embodiment coupling device 37 comprises a projection 40 that projects from the adjoining sections of operating element 24 or operating ring 25 parallel to the height axis H and particularly projects beyond a plane in which the support surface 15 is located. In circumferential direction around height axis H multiple and according to the example, two projections 40 can be arranged with distance to each other. In the embodiment the two projections 40 are arranged diametrically opposite each other relative to the height axis H.

A recess 41 of counter coupling device 38 is assigned to each projection 40. The recess 41 has a contour that is configured to locate the assigned projection 40 therein. Preferably, the width of the recess 41 in circumferential direction around the height axis H is substantially equal to the width of projection 40 in circumferential direction around the height axis H. In doing so, a substantially play-free torque-proof connection can be achieved, if coupling device 37 and counter coupling device 38 establish a connection with each other.

Alternatively thereto the recess 41 can be larger than the projection 40 in circumferential direction around the height axis H. In doing so, a movement play between spindle adapter 39 and operating element 24 can be achieved. This movement play can be used to move the operating element 24 only with a time offset after start of the relative rotation of spindle adapter 39 relative to workpiece holder 12.

In the embodiment spindle adapter 39 has a hollow cylindrical circumferential wall 42 in which the at least one and according to the example, the two recess 41 is or are provided. The recess 41 is present at a bottom edge of the circumferential wall 42 and is open downwardly. In doing so, the circumferential wall 42 can be moved from the top toward the operating element 24 such that each projection 40 is located in an assigned recess 41. By means of a rotation of spindle adapter 39 around height axis H, the operating element 24 can be moved between first position P1 and second position P2. This movement can be carried out by means of tool spindle 45 of machine tool 46, as explained in the following based on FIG. 6-14. Thereby a spindle axis A of tool spindle 45 can coincide with height axis H.

The tool spindle 45 of machine tool 46 is movable in multiple degrees of freedom and particularly in at least two linear degrees of freedom relative to the machine clamping device 47 and the magazine unit 48. The spindle holder 52 can in addition be rotated around spindle axis A.

The machine tool 46 is illustrated in FIG. 6-14 only highly schematically. It comprises the tool spindle 45, a machine clamping device 47 as well as a magazine unit 48 with multiple storing locations 49 for a tool and/or a workpiece 11. The workpiece 11 is thereby arranged on the workpiece holder 12 that is connected with spindle adapter 39, if the unit consisting of workpiece 11 and workpiece holder 12 is put down at a storing location 49.

Spindle adapter 39 as well as tools 50 have a spindle interface 51 respectively that is configured to be held in a spindle holder 52 of tool spindle 45. For example, the spindle interface 51 is configured according to a standard, e.g. a tool taper, such as a Morse taper, steep taper or hollow shank taper.

It is apparent from FIGS. 1-3 that base 14 has multiple and according to the example, four holding bolts 17 at the bottom side opposite the support surface 15 analog to the workpiece holder 12. They can be identically equipped and configured as holding bolts 17 of workpiece holder 12. The machine clamping device 47 of machine tool 46 can, therefore, have holes 16 and clamping bodies 31 assigned to the holes comparable to the operating device 23 of clamping device 10. For clamping the clamping device 10 on the machine clamping device 47, therefore, the same principle can be used as for the clamping of the workpiece holder 12 on clamping device 10. For clamping and releasing the clamping device 10, particularly also a slider can be used that is movably coupled with the clamping bodies, e.g. via wedge bodies and a wedge surface arrangement. For details reference is made to the explanation of operating device 23 above based on FIGS. 4 and 5.

Storing locations 49 for tools 50 and a unit consisting of workpiece holder 12, workpiece 11 and spindle adapter 39 can be configured arbitrarily. In the embodiment illustrated here the storing locations 49 are arranged in the magazine unit 48. The magazine unit 48 can be configured entirely passively, if the tool spindle 45 is able to reach all of the storing locations 49. Alternatively to this the magazine unit 48 can have movable magazine parts in order to arrange a storing location 49 at an exchange position that can be reached by tool spindle 45 in order to pick up a tool 50 or workpiece unit in the exchange position or arrange it on an empty storing location 49 of magazine unit 48.

Figure 24:
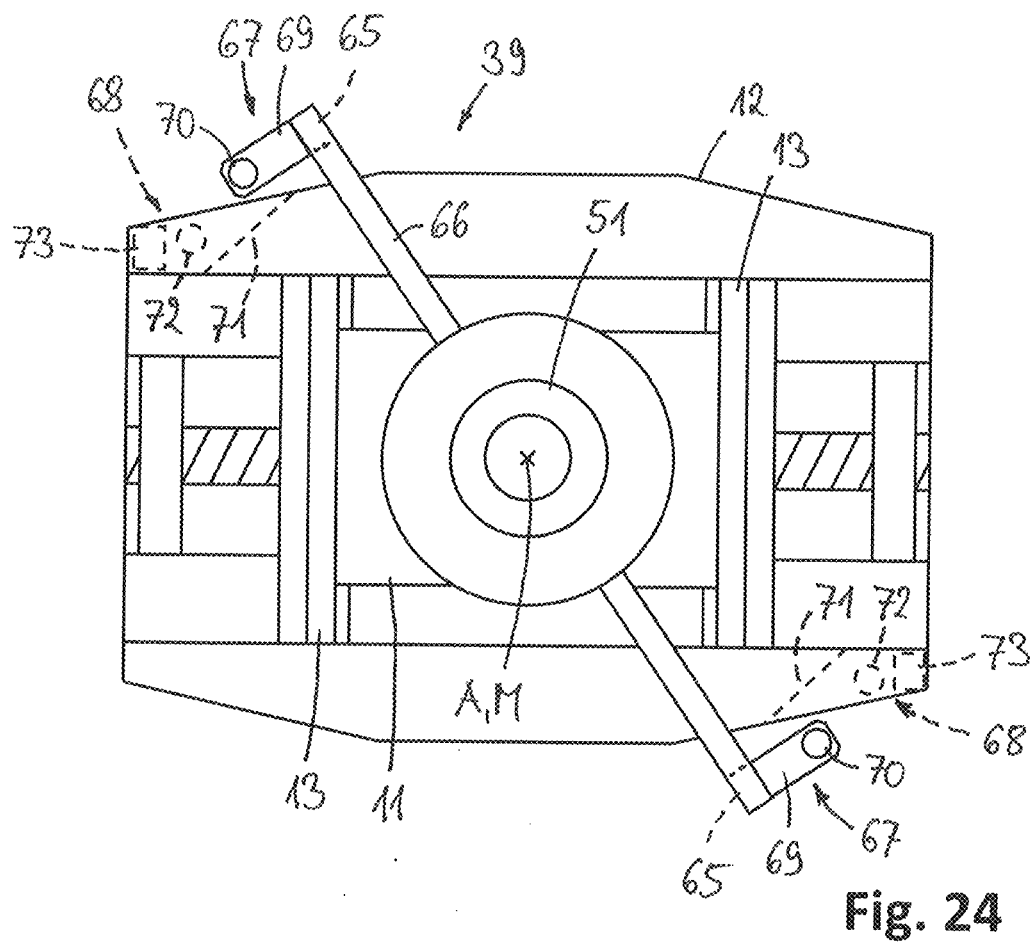

For forming a workpiece unit from workpiece 11, workpiece holder 12 and spindle adapter 39, the spindle adapter 39 is releasably connected with workpiece holder 12. This connection can be established, for example, based on a bayonet connection or latch connection or another kind of force-fit and/or form-fit connection. Particularly, the creation and releasing of the connection is carried out by means of a relative rotation of spindle adapter 39 and workpiece holder 12 around a longitudinal center axis M of spindle interface 51 of spindle adapter 39. This relative rotation for establishing the connection and for releasing the connection is less than 360° and, for example, less than 90° and further preferably less than 45°. The connection device for establishing of this releasable connection can be configured, for example, as illustrated in FIG. 24 and will be explained in the context with a further embodiment of the invention.

Figure 6:
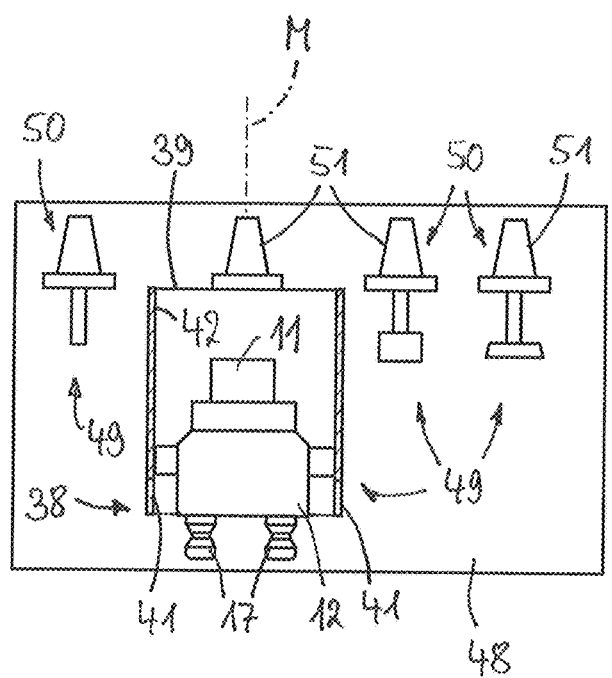
Figure 6:
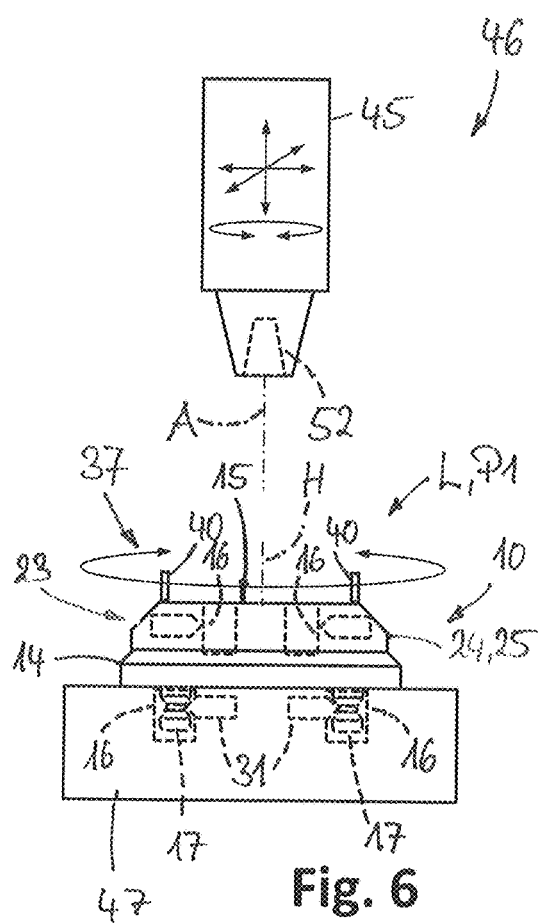

An embodiment of the method according to the invention, using the clamping device 10 according to FIGS. 1-5 is explained in the following with reference to FIGS. 6-14 in detail:

It is assumed that in the initial situation a workpiece 11 to be machined is arranged by means of the workpiece holder 12 and spindle adapter 39 at a storing location 49. The clamping device 10 is in the release condition L (FIG. 6).

Figure 7:
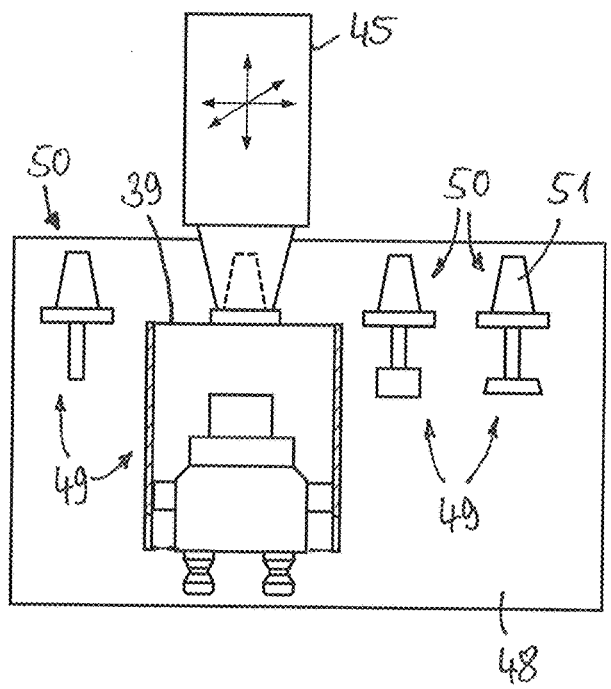
Figure 7:
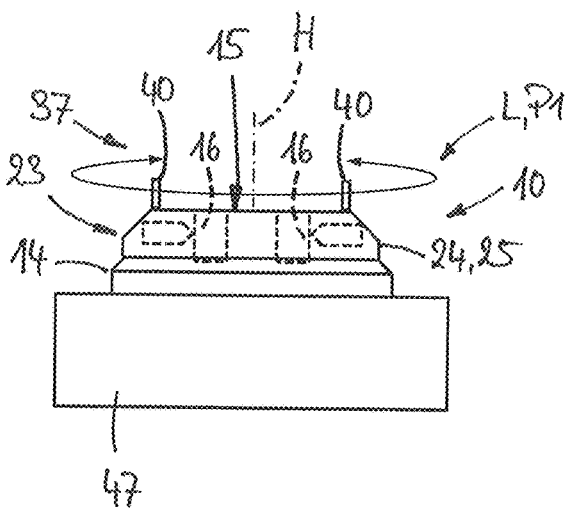
Figure 8:
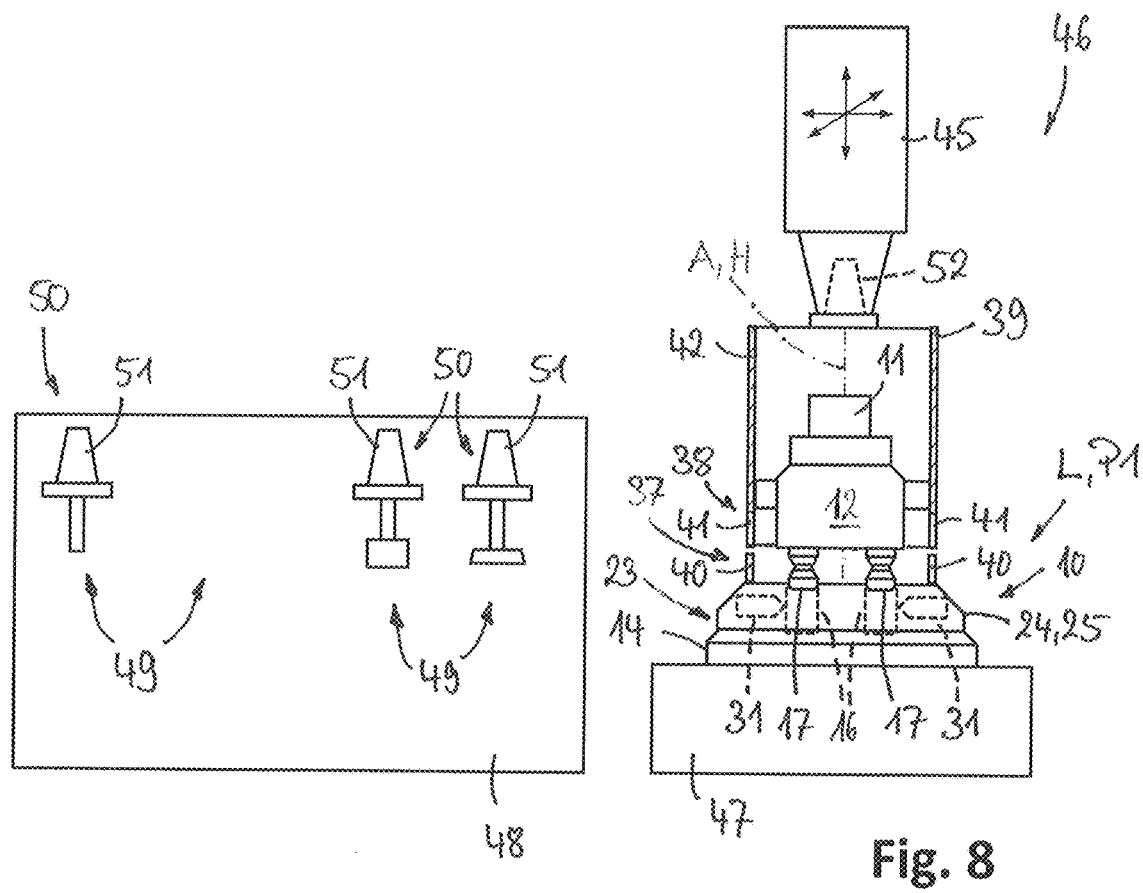

The workpiece 11 to be machined is picked up by means of spindle adapter 39 by tool spindle 45 from the respective storing location 49 (FIG. 7). Subsequently, the tool spindle 45 moves the workpiece holder 12 with workpiece 11 by means of spindle adapter 39 to clamping device 10 and places workpiece holder 12 onto clamping device 10 parallel to height axis H. During this movement holding bolts 17 are inserted into a respectively assigned hole of clamping device 10 and in addition coupling between coupling device 37 and counter coupling device 38 is established, in that the projections 40 engage the recesses 41 (FIG. 8).

Figure 9:
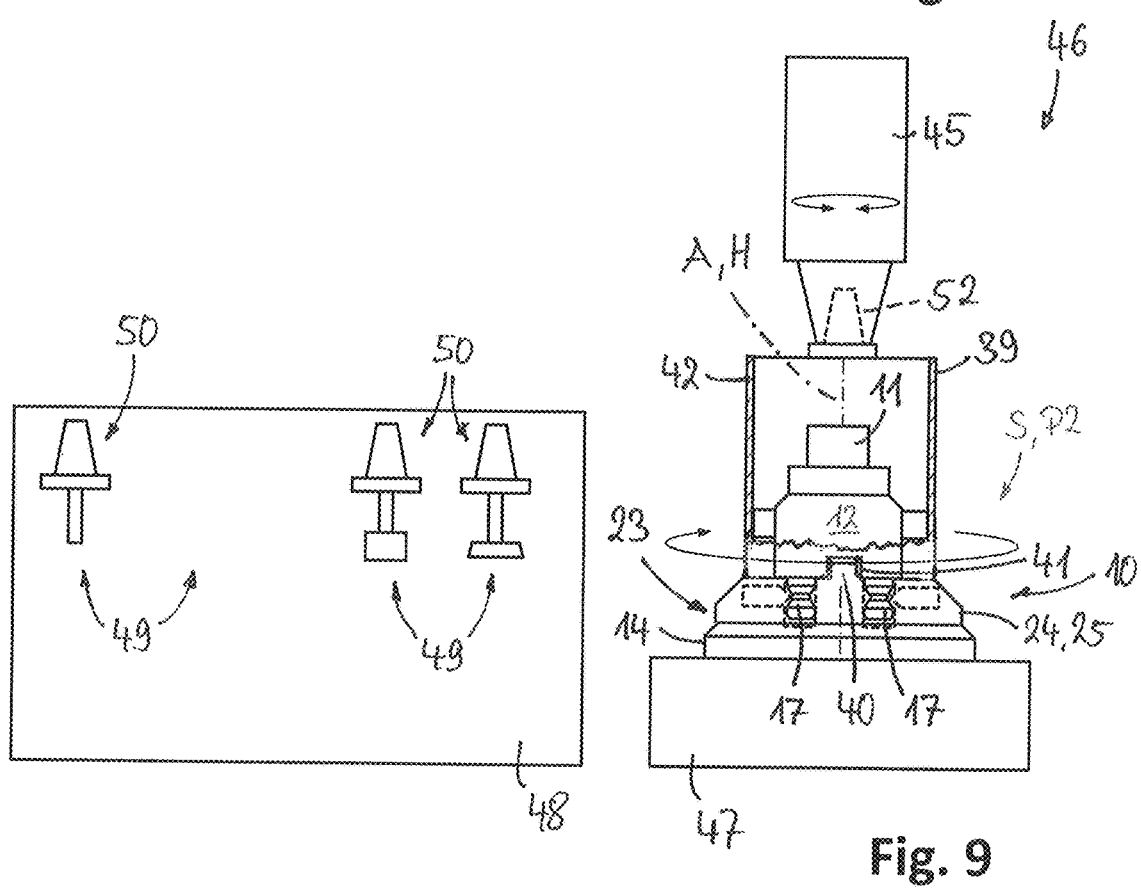

In this position spindle axis A and height axis H of clamping device 10 coincide with sufficient accuracy. Because of the established rotational coupling between spindle adapter 39 and operating element 24 by means of coupling device 37 and counter coupling device 38, tool spindle 45 can carry out a rotational movement of spindle holder 52 around spindle axis A, such that a rotation movement of operating element 24 from the first position P1 in direction toward the second position P2 is carried out by means of spindle adapter 39 and clamping device 10 takes the clamping condition S (FIG. 9).

Figure 10:
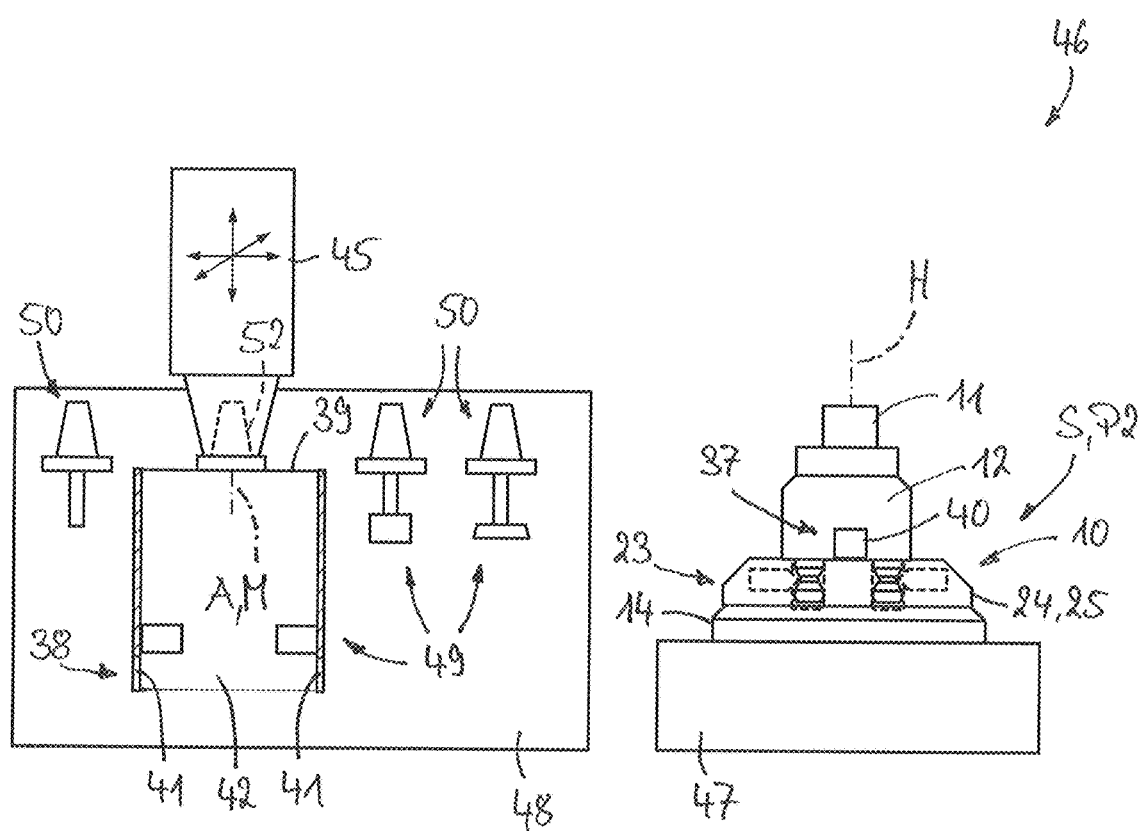

In the embodiment illustrated here in addition spindle adapter 39 is released from workpiece holder 12 during this rotational movement. Subsequently, spindle adapter 39 can be put down at an empty storing location 49 of magazine unit 48 by a respective movement of tool spindle 45 (FIG. 10).

Figure 11:
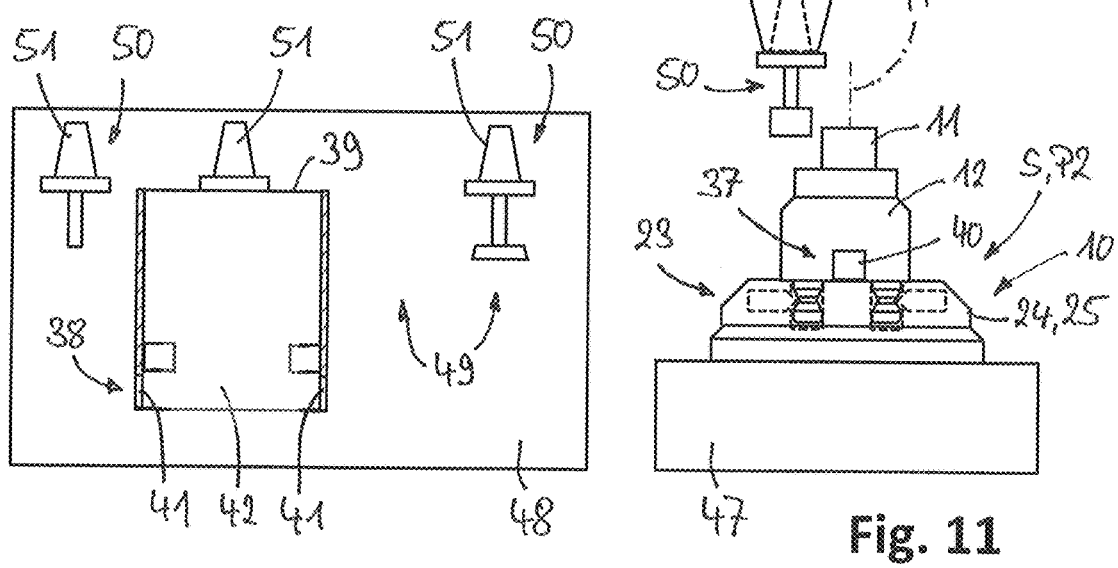
Figure 12:
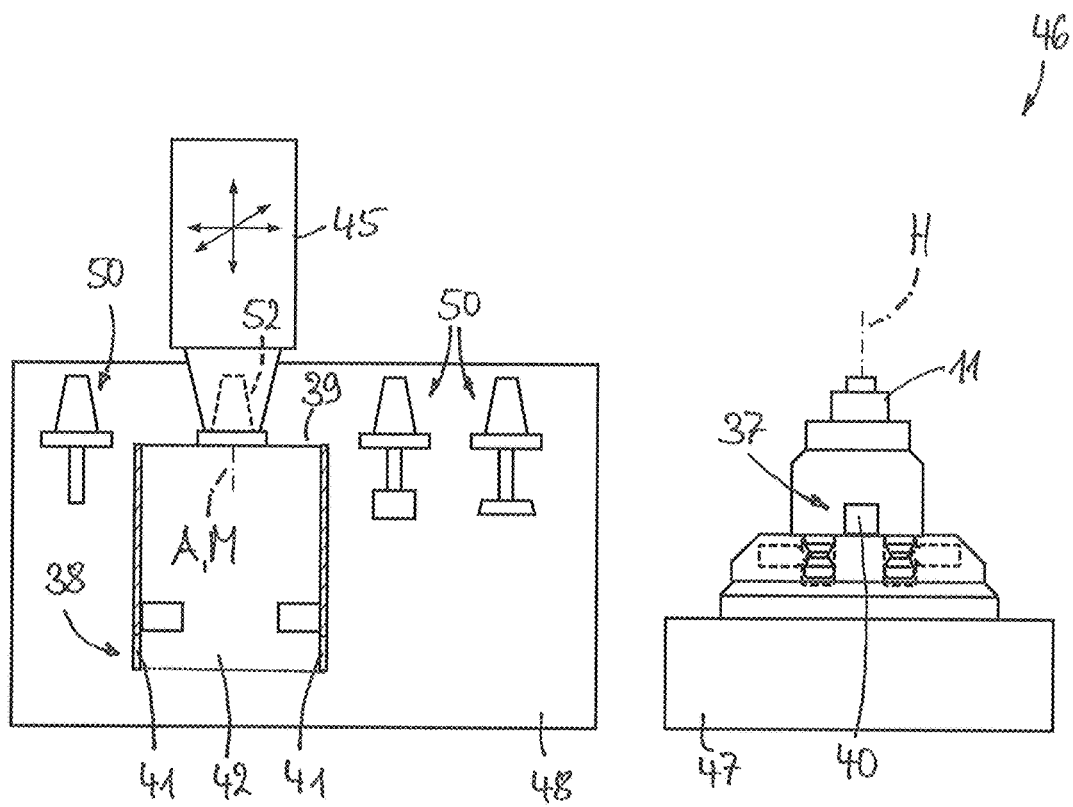

After storing spindle adapter 39, tool spindle 45 can pick up a tool 50 in order to carry out actions on the workpiece 11, e.g. a chip removing machining. Particularly rotationally driven machining tools can be used for machining the workpiece 11, such as drills or mills. In addition or as an alternative, also measuring tools can be used as tools 50 in order to measure the workpiece 11 prior to or after a chip removing machining. Only by way of example, a chip removing machining of workpiece 11 by means of a milling tool is shown in FIG. 11. FIG. 12 shows the machine workpiece 11 that is still held by means of the workpiece holder 12 and clamping device 10 in the machine tool 46.

Figure 13:
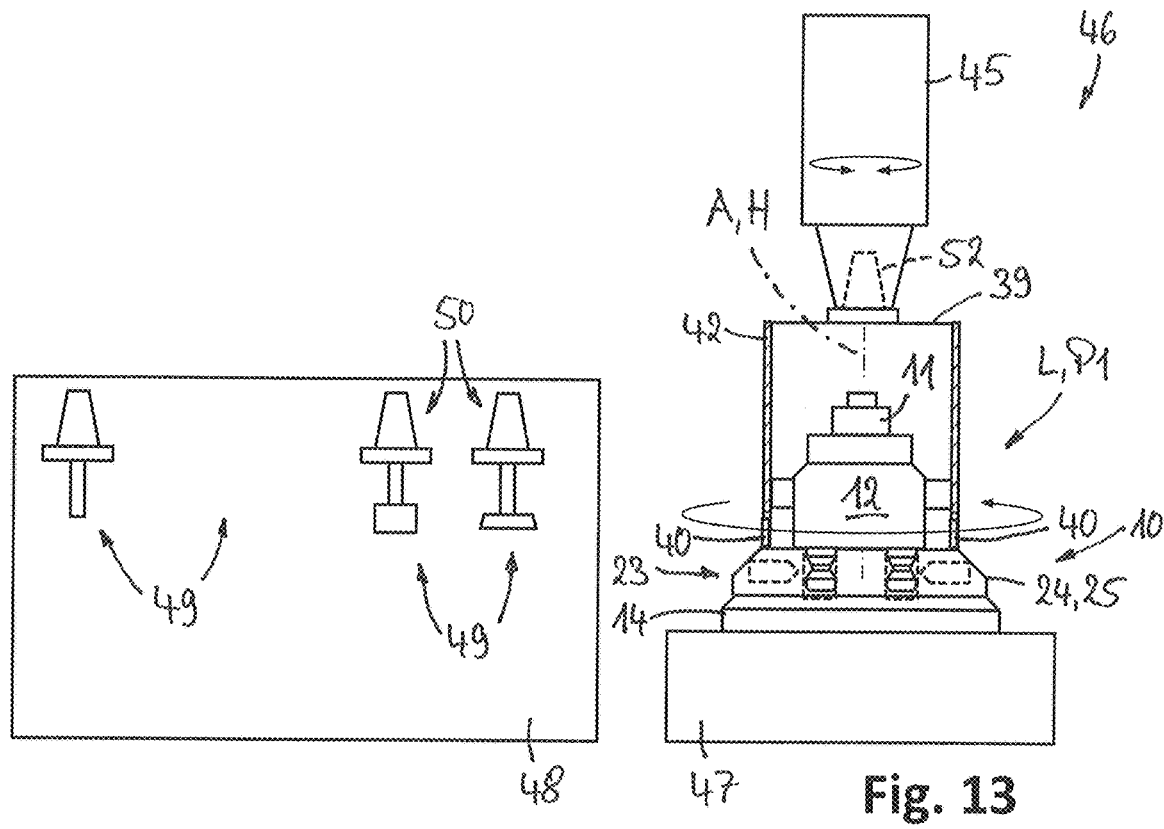

Subsequent to processing workpiece 11 by means of at least one tool 50, tool spindle 45 of machine tool 46 takes up a spindle adapter 39 from a storing location 49 again (FIG. 12) and moves it to the clamping device 10 such that spindle axis A and height axis H coincide substantially. Spindle adapter 39 is releasably connected with operating element 24 by means of coupling device 37 and counter coupling device 38. Subsequently, a rotational movement of spindle adapter 39 around spindle axis A or height axis H is carried out by means of tool spindle 45, whereby operating element 24 is moved from the second position P2 into the first position P1. In doing so, clamping device 10 is again switched from clamping condition S into release condition L. During this rotational movement in addition, a connection between spindle adapter 39 and workpiece holder 12 is established (FIG. 13).

Figure 14:
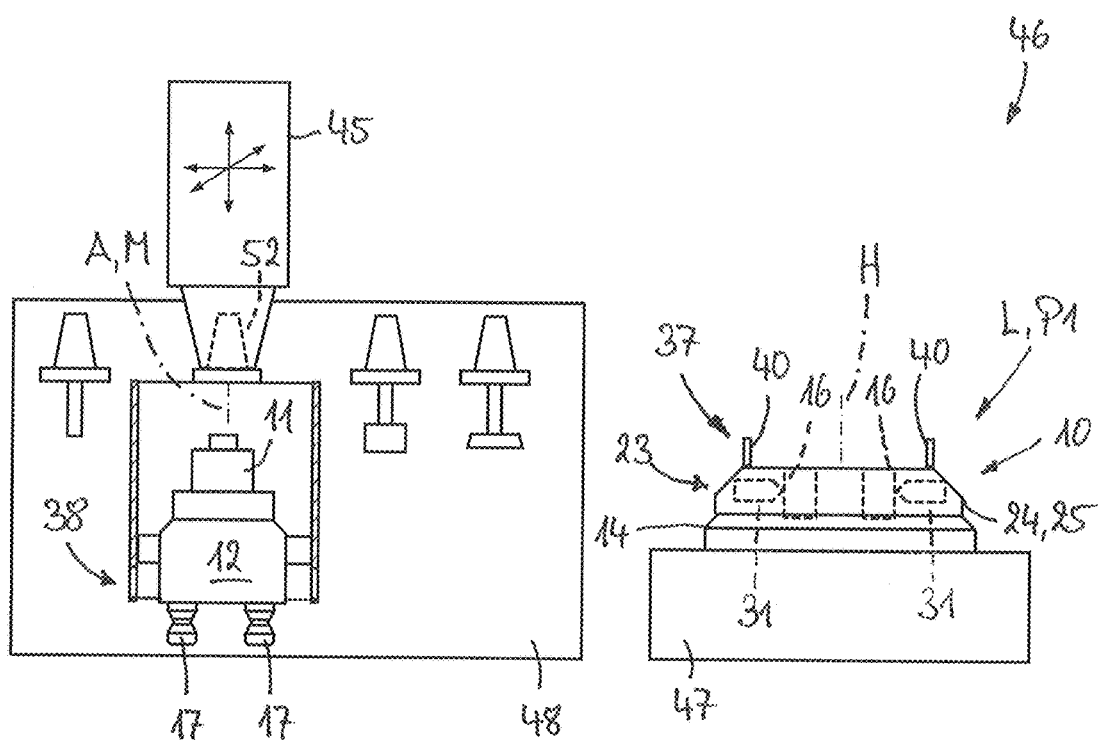

Finally the machined workpiece can be removed from clamping device 10 and can be put down together with workpiece holder 12 and spindle adapter 39 at a storing location 49 (FIG. 14). Subsequently, the method can be carried out for another workpiece to be machined.

Therefore, by movement of tool spindle 45 solely, a workpiece change as well as a tool change can be carried out. Clamping device 10 allows an automatic clamping and releasing of workpiece holders 12 on clamping device 10. The clamping device 10 is mechanically operated by means of a movement of tool spindle 45 and switched between release condition L and clamping condition S. the machine clamping device 47 itself does not have to be controllable hydraulically, pneumatically or by means of an electric motor. By means of clamping device 10 an automatic machining of workpieces 11 with one or multiple tools 50 can be realized, also in machine tools 46 with simple equipment, e.g. in order to manufacture small batches.

FIG. 20 perspectively illustrates another embodiment of a clamping device 10 in which operating element 24 is configured as operating lever 57 that is pivotably arranged around a rotation axis D on base 14. The rotation axis D extends orthogonal to the support surface 15 and is arranged offset with regard to support surface 15. Operating lever 57 is supported in a lateral area of base 14 between support surface 15 and bottom side having the holding bolts 17.

As in the previous embodiment, operating lever 57 that forms operating element 24 here, is part of operating device 23. The configuration of operating device 23 for clamping device 10 of FIG. 20 is schematically illustrated in FIG. 21. Operating lever 57 can be pivoted around rotation axis D between the first position P1 and the second position P2. In FIG. 21 the first position P1 is illustrated in dashed lines and the second position P2 is illustrated with solid lines. The operating lever 57 is movably coupled with an eccentric body 58 and according to the example operating lever 57 and eccentric body 58 form together a monolithic component. At an outer side facing away from rotation axis D eccentric body 58 has an outer surface that forms the cam surface 26. Slider 28 abuts against cam surface 26 in a manner to be movably supported orthogonal or radial to rotation axis D. Apart therefrom, the operating device 23 is configured analog to the operating device 23, as it has been explained with reference to FIGS. 4 and 5 of clamping device 10 according to the invention. In so far, reference can be made to the description above.

Figure 17:
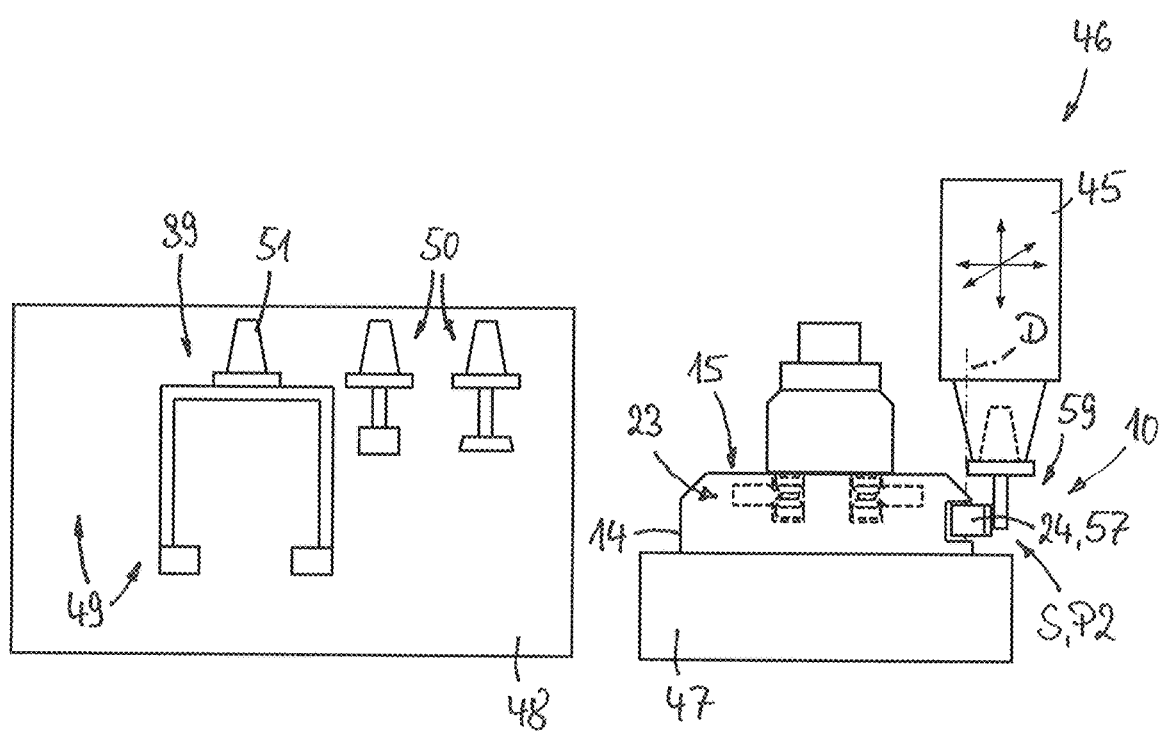
Figure 18:
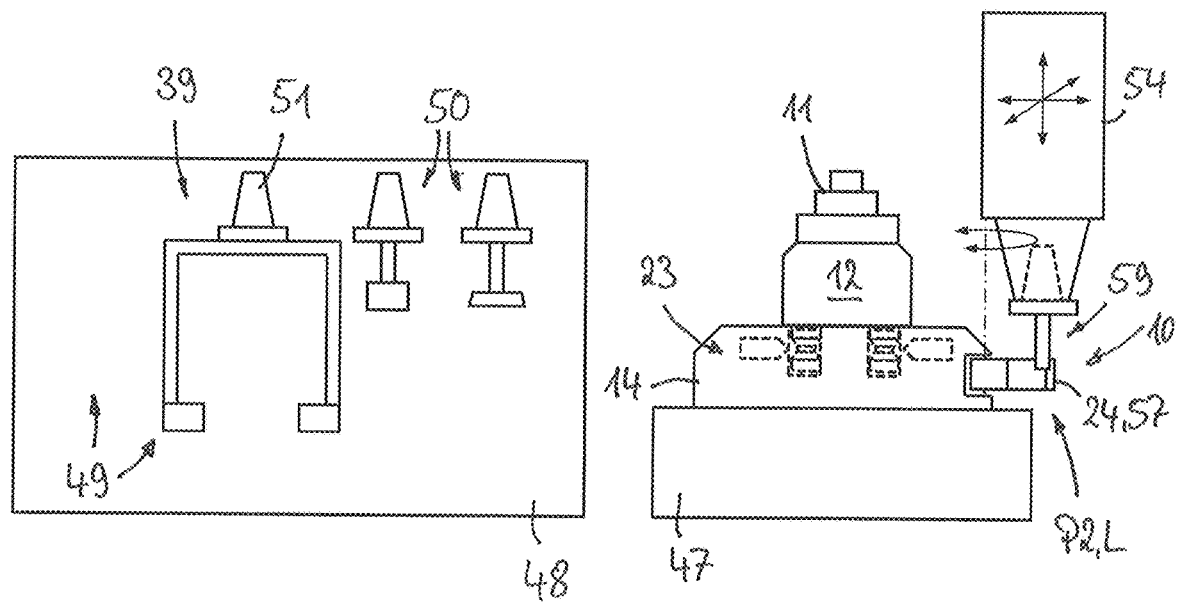

In the embodiment of clamping device 10 illustrated in FIGS. 20 and 21, operating lever 57 is moved or pivoted around rotation axis D between first position P1 and second position P2 by means of a movement of tool spindle 45 along a path curve K1, K2. Thereby tool spindle 45 can directly engage operating lever 57 or can use an operating tool 59 having an operating pin 60, as illustrated in FIGS. 17 and 18 by way of example. Thereby operating pin 60 or tool spindle 45 is moved along a first path curve K1 for switching the clamping device 10 from release condition L into the clamping condition S that is illustrated in dashed lines in FIG. 21. Thereby operating lever 57 is moved from the first position P1 into the second position P2. In turn for moving operating lever 57 from the second position P2 into the first position P1 and thus for switching the clamping device 10 from clamping condition S into release condition L, operating pin 60 or tool spindle 45 is moved along a second path curve K2 that is illustrated in dashed lines in FIG. 21.

The path curves K1 and K2 are different from each other. According to the example, they comprise a traverse in each case having adjoining straight sections. The locations at which straight sections adjoin one another and require a direction change of the movement direction so-to-speak are schematically marked by a point.

FIG. 24 illustrates another embodiment of a spindle adapter 39. Spindle adapter 39 has two arms 65 that are arranged on diametrically opposite sides relative to the longitudinal center axis M of spindle interface 51. The arms 65 can extend parallel to each other and parallel to the longitudinal center axis M. The arms 65 have the same distance from the longitudinal center axis M and move during a rotation of the spindle adapter 39, preferably on a common circular path around the longitudinal center axis M.

The arms 65 are connected with spindle interface 51 of spindle adapter 39, for example by means of a connection leg 66. On each arm 65 and according to the example, on the free end of each arm 65, spindle adapter 39 comprises a latch device 67 that is configured to establish a latch connection with a counter latch device 68 of workpiece holder 12. The latch device 67 and the counter latch device 68 are schematically illustrated in FIG. 24. A latch projection 69 projecting obliquely or orthogonal from arms 65 is part of latch device 67. The latch projection 69 extends approximately tangentially or in circumferential direction around the longitudinal center axis M. On the latch projection 69 a latch body 70 is arranged. The latch body 70 can be preloaded into an initial position and can be moved against the preloading force into the latch projection 69. The latch body 70 can be, e.g. a ball or a ball segment.

The counter latch device 68 comprises depressions 71 on the workpiece holder 12 that are laterally open on the outward side. The depressions 71 are arranged diagonally opposite each other in corner areas of the approximately cuboid-shaped workpiece holder 12. Within each depression 71 a latch recess 72 is arranged that is assigned to the latch body 70 and into which the latch body 70 can engage, if the latch projection 69 is moved into the depression 71 in order to establish the latch connection. During movement of latch projection 69 into the recess 71, latch body 70 can be moved against the preloading force into the latch projection 69. As soon as latch body 70 reaches the latch recess 72 it is urged into the latch recess 72 by means of the preloading force. In this condition the latch connection between the latch device 67 and the counter latch device 68 is established.

The latch connection can be established and released by means of a relative rotation of spindle adapter 39 relative to the workpiece holder 12, depending on the rotational sense of the relative rotation around the longitudinal center axis M. This relative rotational movement can be carried out by means of tool spindle 45, if tool spindle 45 holds spindle adapter 39 in spindle holder 52. If the latch connection is established, workpiece holder 12 can be transported together with workpiece 11 by means of the tool spindle 45 analog to the embodiment described above.

It is also apparent from FIG. 24 that depression 71 can have a stop 73, at least on one side with view in a direction tangential to the longitudinal center axis M or spindle axis A. If the latch connection is established, latch projection 69 abuts against stop 73.

Figures 25, 26:
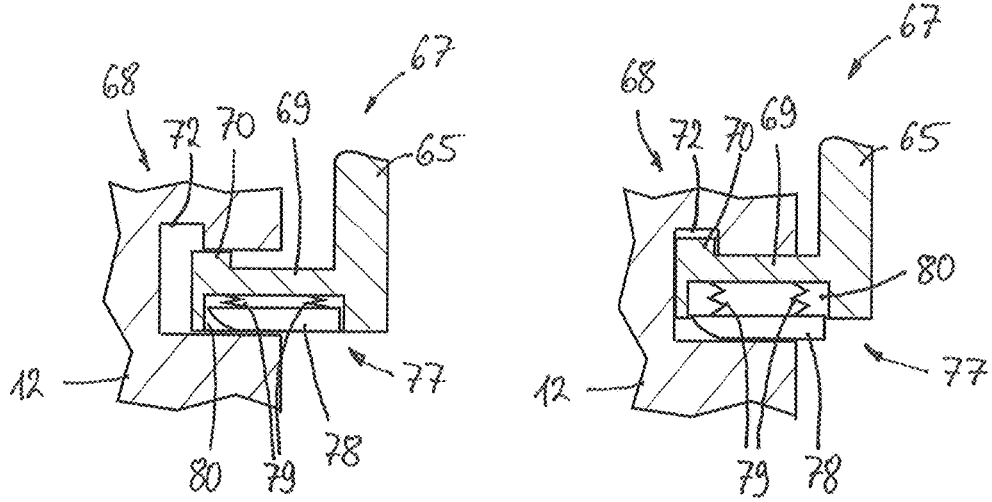

By way of example, modifications for the configuration of the latch device 67 and the counter latch device 68 are highly schematically illustrated in FIGS. 25 and 26. The latch body 70 is in this embodiment immovably arranged on latch projection 69, e.g. on an end of latch projection 69 opposite the arms 65. Analog to the embodiment according to FIG. 24, latch body 70 can project upwardly.

On the bottom side opposite latch body 70, the latch projection 69 comprises a locking arrangement 77. The locking arrangement 77 comprises a support body 78 that is supported by means of a spring arrangement 79 in a recess 80 on the latch projection 69. The recess 80 is open downwardly. The support body 78 can be moved against the spring force of spring arrangement 79 into the recess 80 and is urged by means of the spring force of spring arrangement 79 out of recess 80. The spring force of spring arrangement 79 acts in direction away from latch body 70.

During insertion of latch projection 69 into depression 71 of workpiece holder 12, support body 78 is moved into recess 80 against the spring force of spring arrangement 79. As soon as latch body 70 reaches latch recess 72, latch projection 69 can be moved into the latch recess 72. This movement can be carried out by means of tool spindle 45. Due to the spring force of spring arrangement 79, support body 78 is partly or entirely urged out of recess 80 and takes the locking position illustrated in FIG. 26. In this locking position the spring force of spring arrangement 79 supports support body 78 against workpiece holder 12 and urges latch body 70 into latch recess 72.

By means of this configuration it is guaranteed that the latch connection is maintained by means of the spring force of spring arrangement 79 as long as no outer force acts on spindle adapter 39 parallel to the longitudinal center axis M. Rotational movements or rotational accelerations of spindle adapter 39 cannot result in an unintentional disconnection of the latch connection.

In circumferential direction around the longitudinal center axis M or tangentially thereto, latch body 70 is preferably abutting against the walls of latch recess 72. In order to avoid unintentional releasing the latch connection, it is advantageous if latch body 70 and latch recess 72 have side surfaces assigned to each other that are substantially parallel to the longitudinal center axis M.

The self-locking function described above for avoiding an unintentional disconnection of the latch connection can alternatively also be achieved by other configurations, e.g. if the support body 78 is not arranged on the latch projection 69, but on the depression 71.

In another modification the spring arrangement 79 and/or the support body 78 can also be replaced by an elastically deformable support body, e.g. by a leaf spring arranged in the recess 80.

The clamping device 10 according to FIG. 20 and spindle adapter 39 according to FIG. 24 can be used for carrying out the method according to the invention, which is explained in the following based on FIGS. 15-19.

Figure 15:
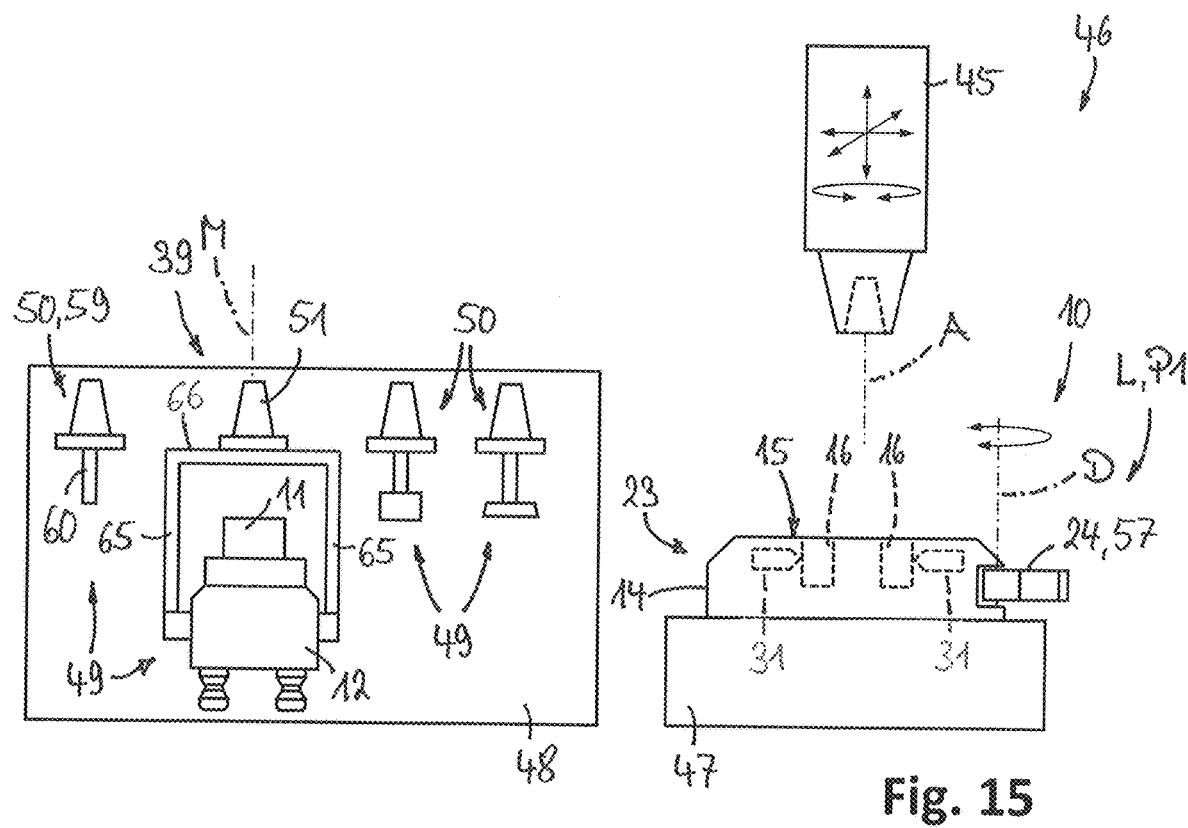
Figure 16:
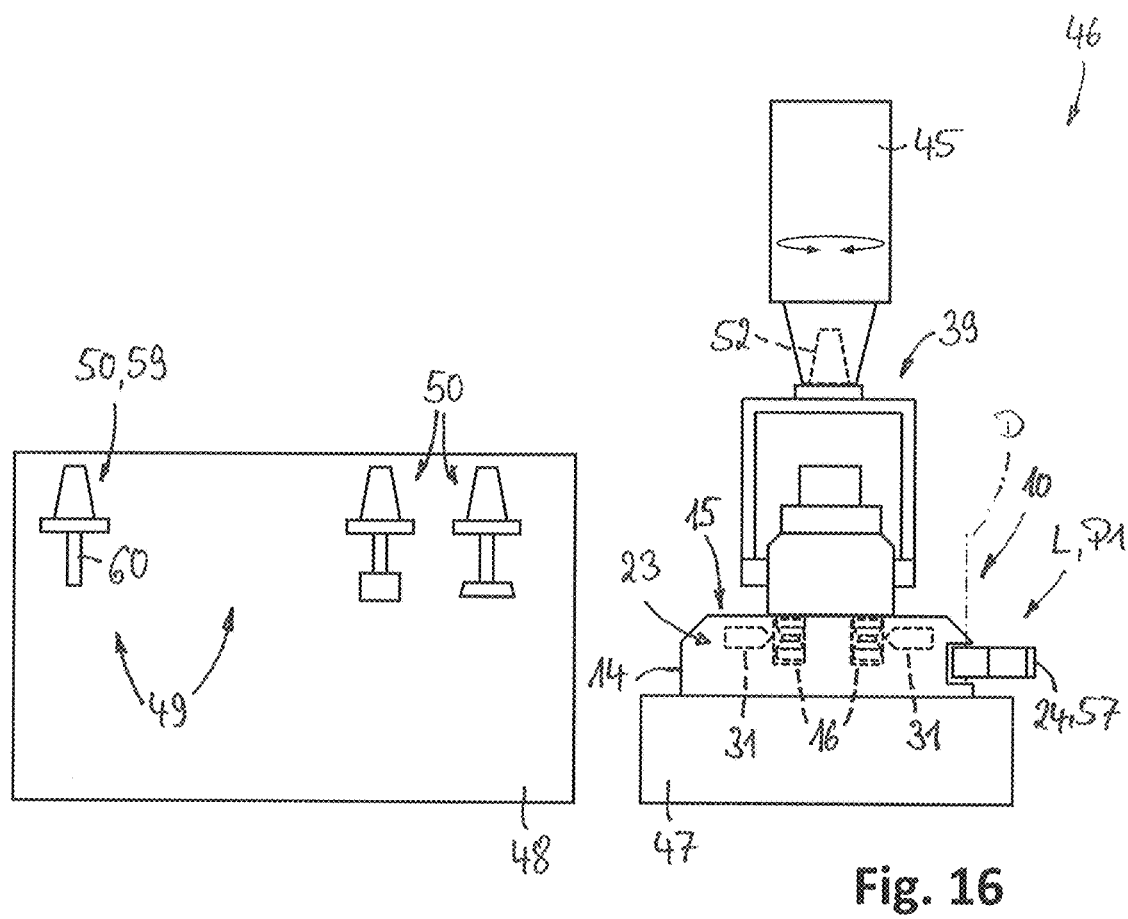

In the initial position according to FIG. 15, the clamping device 10 is in the release condition L and the operating lever 57 is in the first position P1. As in the first embodiment of the method, the tool spindle 45 can pick up the spindle adapter 39 with the workpiece holder 12 and the workpiece 11 arranged thereon from a storing location 49 and can arrange it on the clamping device 10 (FIG. 16). Now a releasable connection between spindle adapter 39 and workpiece holder 12 is disconnected by means of a relative rotation that is carried out by means of the tool spindle 45. According to the example, thereby the described latch connection is disconnected and the spindle adapter 39 can be put down at a storing location (FIG. 17).

After putting down the spindle adapter 39, the tool spindle 45 picks up the operating tool 59 and brings operating pin 60 of operating tool 59 in contact with operating lever 57 (FIG. 17). Due to a movement along the first path curve K1, operating lever 57 is pivoted out of the first position P1 into the second position P2 and thus clamping device 10 is switched into clamping condition S.

As described in the context of the first embodiment of the method, subsequently a tool 50 can be picked up and the workpiece 11 can be machined. After termination of the machining the operating tool 59 can be picked up again and can be brought into contact with the operating lever 57. By means of a subsequent movement of operating tool 59 along the second path curve K2, operating lever 57 is moved out of the second position P2 again into the first position P1 and the clamping device 10 is thereby brought into the release condition L (FIG. 18).

Figure 19:
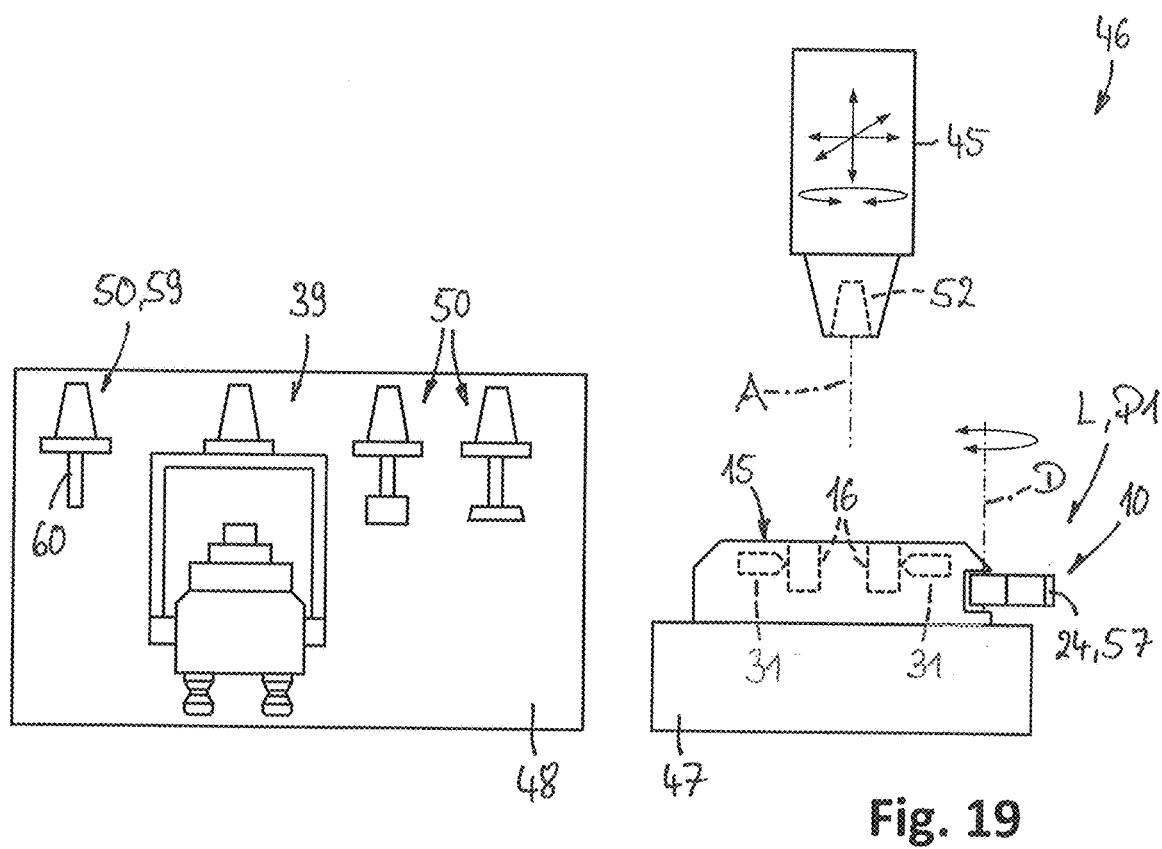

Subsequently, tool spindle 45 can put down operating tool 59 and can pick up spindle adapter 39. The machine workpiece 11 can be picked up by establishment of the releasable connection between spindle adapter 39 and workpiece holder 12 and can be put down on an empty storing location 49 (FIG. 19). This method can be repeated for an arbitrary number of workpieces.

The invention refers to a clamping device 10 and a method for handling a workpiece 11 or a unit comprising a workpiece 11 and a workpiece holder 12. An automatic workpiece exchange is enabled by using a tool spindle 45. For this a spindle adapter 39 is present that can be releasably connected with the workpiece holder 12. By means of the spindle adapter 39, the unit comprising the workpiece 11 and the workpiece holder 12 can be transported. The clamping device 10 can be switched between a release condition L and a clamping condition S by means of a movement of an operating element 24. This movement can be carried out by means of the tool spindle 45, in that the tool spindle 45 engages the operating element 24 directly or indirectly by means of the spindle adapter 39 or an operating tool 59.

LIST OF REFERENCE SIGNS 10 clamping device
11 workpiece
12 workpiece holder
13 clamping jaw
14 base
15 support surface
16 hole
17 holding bolt
18 conical surface
19 ring groove
23 operating device
24 operating element
25 operating ring
26 cam surface
27 abutment site
28 slide
29 wedge surface pair
30 wedge body
31 clamping body
31a clamping end
32 preloading device
33 coupling device
34 end piece
35 roller body
36 balancing unit
37 coupling device
38 counter coupling device
39 spindle adapter
40 projection
41 recess
42 circumferential wall
45 tool spindle
46 machine tool
47 machine clamping device
48 magazine unit
49 storing location
50 tool
51 spindle interface
52 spindle holder
57 operating lever
58 eccentric body
59 operating tool
60 operating pin
65 arm
66 connection leg
67 latch device
68 counter latch device 69 latch projection
70 latch body
71 depression
72 latch recess
73 stop
77 locking arrangement
78 support body
79 spring arrangement
80 recess
α angular range
A spindle axis
D rotation axis
H height axis
K1 first path curve
K2 second path curve
L release condition
M longitudinal center axis of spindle interface
P1 first position
P2 second position
S clamping condition

The invention claimed is:

1. A combination, comprising:
   a machine tool, comprising:
      a tool spindle, and
      a spindle adapter having a counter coupler, wherein the spindle adapter is adapted to be held by the tool spindle; and
   a clamping device for clamping a workpiece holder on the machine tool, comprising:
      a base having a support surface for receiving the workpiece holder, and
      an operating device arranged on the base, the operating device comprises at least one slider,
      wherein the base comprises an operating element, which is moveable between a first position and a second position along a path about a height axis, the path being a circular path or a circular arc path, and where the height axis intersects and is orientated orthogonal to the support surface,
      wherein the operating element is an operating ring comprising a coupler, which is configured to be releasably coupled with the counter coupler of the spindle adapter,
      wherein the clamping device is in a release condition releasing the workpiece holder, if when the operating element is in the first position, and the clamping device is in a clamping condition clamping the workpiece holder when the operating element is in the second position, and
      when the tool spindle holds the spindle adapter and the counter coupler of the spindle adapter is brought into engagement with the coupler of the operating element, rotation of the spindle adapter about the height axis results in the operating element being rotated about the support surface and along the path about the height axis such that the operating element is moved between the first position and the second position.

2. The combination according to claim 1, wherein the combination further comprises a magazine unit, which is configured to store the spindle adapter when the spindle adapter is not held by the tool spindle.

3. The combination according to claim 1, wherein the at least one slider is movably supported and abuts against the operating element.

4. The combination according to claim 3,
   wherein the operating element comprises at least one operating ring cam surface against which the at least one slider abuts, or
   wherein each of the at least one slider comprises a respective slider cam surface against which the operating element abuts and wherein each respective slider cam surface comprises a corresponding profile that is not coaxial relative to the height axis.

5. The combination according to claim 4, wherein at least one roller body is provided that abuts against the slider cam surface of one of the at least one slider, and wherein the at least one roller body is rollably supported on the operating element or on the one of the at least one slider.

6. The combination according to claim 3, wherein the at least one slider is movably coupled with multiple clamping bodies that are movably supported.

7. The combination according to claim 6, wherein the operating device comprises a balancer that is configured to deform elastically, if a force transmitted between the operating element and the multiple clamping bodies increases and/or exceeds a force threshold.

8. The combination to claim 6, wherein the base comprises multiple holes for locating holding bolts therein arranged on the workpiece holder, wherein one clamping body of the multiple clamping bodies of the operating device is assigned to each hole of the multiple holes.

9. The combination according to claim 6, wherein the at least one slider and the multiple clamping bodies are movably coupled by means of a wedge surface arrangement.

10. The combination according to claim 1, wherein the tool spindle of the machine tool has multiple degrees of freedom.

11. The combination according to claim 10, wherein a spindle axis of the tool spindle coincides with the height axis of clamping device when the coupler and the counter coupler are in engagement with one another.

12. A method for handling a workpiece with the combination of claim 1, the machine tool of the combination comprising a magazine unit, wherein the method comprises the following steps:
    providing the combination of claim 1,
    providing a workpiece holder to which the workpiece is clamped,
    attaching the clamping device on the machine tool,
    picking up the workpiece holder from the magazine unit with the spindle adapter when the spindle adapter is held by the tool spindle, transporting the workpiece holder to the clamping device, and placing the workpiece holder on the clamping device,
    operating the operating element of the clamping device by means of a movement of the tool spindle in order to bring the clamping device into the clamping condition in which the clamping device clamps the workpiece holder,
    releasing a connection between the spindle adapter and the tool spindle, and
    picking up a tool from the magazine unit, and carrying out actions on the workpiece with the tool when the tool is held by the tool spindle.

13. The method according to claim 12, wherein a connection between the spindle adapter and the workpiece holder is released prior to or during actuation of the operating element for switching the clamping device into the clamping condition.

14. The method according to claim 12, wherein the tool spindle puts the tool down in the magazine unit after having carried out the actions on the workpiece.

15. The method according to claim 12, wherein the tool spindle picks up the spindle adapter and actuates the operating element of the clamping device by means of a further movement of the tool spindle in order to bring the clamping device into the release condition.

16. The method according to claim 15, wherein the connection between the spindle adapter and the workpiece holder is established after or during actuation of the operating element for switching the clamping device into the release condition.

\* \* \* \* \*